Oct. 5, 1965 H. J. TASHJIAN 3,210,736

DATA PROCESSING APPARATUS

Filed Sept. 11, 1961 17 Sheets-Sheet 1

INVENTOR
HARRY J. TASHJIAN

BY Donald F. Voss

ATTORNEY

Oct. 5, 1965 H. J. TASHJIAN 3,210,736

DATA PROCESSING APPARATUS

Filed Sept. 11, 1961 17 Sheets-Sheet 2

Oct. 5, 1965 H. J. TASHJIAN 3,210,736

DATA PROCESSING APPARATUS

Filed Sept. 11, 1961 17 Sheets-Sheet 6

Oct. 5, 1965 H. J. TASHJIAN 3,210,736

DATA PROCESSING APPARATUS

Filed Sept. 11, 1961 17 Sheets-Sheet 8

Oct. 5, 1965 H. J. TASHJIAN 3,210,736

DATA PROCESSING APPARATUS

Filed Sept. 11, 1961 17 Sheets-Sheet 11

CHARACTER CODE CHART
| | G1 | G2 | 12 | 11 | 0 | A | B | C | D | E |
|---|---|---|---|---|---|---|---|---|---|---|
| BLANK | G | G | | | | | | | | |
| 12 | | G | 1 | | | | | | | |
| 11 | | G | | 1 | | | | | | |
| 0-1 | | G | | | 1 | 1 | 1 | | | |
| A 12-1 | | | 1 | | | 1 | 1 | | | |
| B 12-2 | | | 1 | | | 1 | | 1 | | |
| C 12-3 | | | 1 | | | 1 | | | 1 | |
| D 12-4 | | | 1 | | | 1 | | | | 1 |
| E 12-5 | | | 1 | | | | 1 | 1 | | |
| F 12-6 | | | 1 | | | | 1 | | 1 | |
| G 12-7 | | | 1 | | | | 1 | | | 1 |
| H 12-8 | | | 1 | | | | | 1 | 1 | |
| I 12-9 | | | 1 | | | | | 1 | | 1 |
| J 11-1 | | | | 1 | | 1 | 1 | | | |
| K 11-2 | | | | 1 | | 1 | | 1 | | |
| L 11-3 | | | | 1 | | 1 | | | 1 | |
| M 11-4 | | | | 1 | | 1 | | | | 1 |
| N 11-5 | | | | 1 | | | 1 | 1 | | |
| O 11-6 | | | | 1 | | | 1 | | 1 | |
| P 11-7 | | | | 1 | | | 1 | | | 1 |
| Q 11-8 | | | | 1 | | | | 1 | 1 | |
| R 11-9 | | | | 1 | | | | 1 | | 1 |
| S 0-2 | | | | | 1 | 1 | | 1 | | |
| T 0-3 | | | | | 1 | 1 | | | 1 | |
| U 0-4 | | | | | 1 | 1 | | | | 1 |
| V 0-5 | | | | | 1 | | 1 | 1 | | |
| W 0-6 | | | | | 1 | | 1 | | 1 | |
| X 0-7 | | | | | 1 | | 1 | | | 1 |
| Y 0-8 | | | | | 1 | | | 1 | 1 | |
| Z 0-9 | | | | | 1 | | | 1 | | 1 |
| 0 | | | | | 1 | | | | | |
| 1 | | | | | | 1 | 1 | | | |
| 2 | | | | | | 1 | | 1 | | |
| 3 | | | | | | 1 | | | 1 | |
| 4 | | | | | | 1 | | | | 1 |
| 5 | | | | | | | 1 | 1 | | |
| 6 | | | | | | | 1 | | 1 | |
| 7 | | | | | | | 1 | | | 1 |
| 8 | | | | | | | | 1 | 1 | |
| 9 | | | | | | | | 1 | | 1 |
| RUN OUT | | | | | | | | | 1 | 1 |
FIG. 12
| MAGNETIC PULSE GENERATOR | | CARD TIME SECONDARY | CARD TIME PRIMARY |
|---|---|---|---|
| GP 1 | 12° | 12 | 9 |
| GP 2 | 30° | 11 | 8 |
| GP 3 | 48° | 0 | 7 |
| GP 4 | 66° | 1 | 6 |
| GP 5 | 84° | 2 | 5 |
| GP 6 | 102° | 3 | 4 |
| GP 7 | 120° | 4 | 3 |
| GP 8 | 138° | 5 | 2 |
| GP 9 | 156° | 6 | 1 |
| GP 10 | 174° | 7 | 0 |
| GP 11 | 192° | 8 | 11 |
| GP 12 | 210° | 9 | 12 |
| GP 13 | 222° | | |
| GP 14 | 246° | | |
| GP 15 | 270° | | |
| GP 16 | 285° | | |
| GP 17 | 339° | | |
| GP 18 | 349.5° | | |
| GP 19 | 0° | | |
FIG. 13
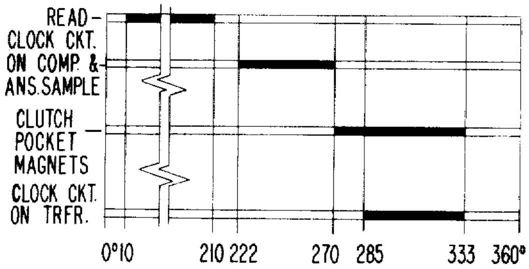
FIG. 14
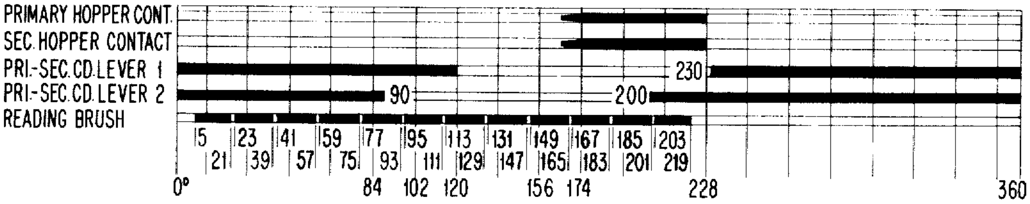
DYNAMIC ELECTRICAL TIMING CHART
FIG. 15

Oct. 5, 1965 H. J. TASHJIAN 3,210,736

DATA PROCESSING APPARATUS

Filed Sept. 11, 1961 17 Sheets-Sheet 15

United States Patent Office 3,210,736
Patented Oct. 5, 1965

3,210,736
DATA PROCESSING APPARATUS

Harry J. Tashjian, Rochester, Minn., assignor to International Business Machines Corporation, New York, N.Y., a corporation of New York Filed Sept. 11, 1961, Ser. No. 137,418
18 Claims. (Cl. 340—172.5)

This invention relates to data processing apparatus and more particularly to record card controlled data processing apparatus of the type generally known in the art as "collators."

The manner in which data is handled by record card controlled data processing apparatus is of prime importance with respect to flexibility, speed of operation, and reliability. Heretofore, record card controlled machines could process either alphabetic or numeric data, but did not have the facility for processing numeric or alphabetic data derived from a record card on a columnar basis. For example, if the record cards to be processed had one field of alphabetic data and another field of numeric data, the alphabetic data could only be processed by one pass through the machine and the numeric data would have to be processed during a second pass through the machine. This, of course, increases the amount of card handling and the amount of time for processing any one card having both numeric and alphabetic data. Additionally, it would either require a change in control panel wiring or two separate setups for the control panel wiring, whether wiring be upon the same panel or separate panels.

Generally, the ability to handle data in both the alphabetic and numeric mode or in any one of these modes in a special submode on a columnar basis arises from the way in which the data is processed. Data checking and comparing takes place serial by bit and serial by character.

In the present invention, the data is sensed from the record cards by conventional brush sensing devices located at discrete positions in the record card paths, there being two card paths, one path for record cards arbitrarily designated primary cards and one for record cards designated secondary cards. The data so sensed from these record cards is encoded directly into data storage apparatus employing magnetic cores. The data entered into data storage is then read out therefrom to permit other apparatus to check the data for certain predetermined conditions, the data now being represented in the form of a particular collatable code.

In order to satisfy the requirements of the particular collatable code and to reduce the requirements of data storage, if certain conditions are found to exist upon checking the data read out from data storage, then additional data is generated by particular circuitry. Furthermore, if certain conditions prevail during the checking of the data read from data storage, then that data, as well as the generated data, is transferred to another or second area of data storage within the data storage device. With the data from the first set of primary and secondary record cards being held in an encoded form in a second area of data storage, data from a second set of primary and secondary cards can be sensed and encoded directly into the first area of data storage.

Subsequently, the encoded data derived from the first set of primary and secondary cards is checked and compared with the encoded data derived from the second set of primary and secondary cards. Then, depending upon the results of the data comparing operation, the clutches for controlling the operation of the primary and secondary card feeds and the card pocket selection apparatus for controlling the diversion of the primary and the secondary cards from their respective card paths selectively into one or two of several card-stacking receptacles are operated. In response to the operation of the clutches for the primary and secondary card feeds, either one or both of the clutches can be operated depending upon the results of data comparing operations; another set of primary and secondary cards or a single primary or a single secondary card will be advanced from the respective record card hopper and transported relative to the brush sensing devices.

By providing a single brush sensing device in each card path, normally two spaced apart brush sensing devices are provided in at least one of the card paths, the amount of control panel wiring is considerably reduced. Furthermore, the apparatus for transferring data from one area of data storage to another is far more reliable than brush sensing devices. Data transfer, once it is determined that the data should be transferred, takes place automatically. This also results in a reduction of control panel wiring.

Also of interest is the fact that circuitry for enabling the transfer of data sensed from the primary and secondary cards to data storage in encoded form is separate and distinct from the circuitry for effecting the transfer of data from data storage to the checking circuitry and for the transfer of data from the first to the second storage area of data storage. This latter circuitry is arranged to conserve the number of magnetic core drivers by having a multiple number of core selection windings, each winding threading a pair of cores, and selecting the particular drivers and gates for these windings.

Accordingly, it is a principal object of the invention to provide an improved record card control data processing apparatus.

Another very important object of the invention is to provide record card control data processing apparatus which has the ability to process either alphabetic or numeric data on a columnar basis.

Another object of the invention is to provide record card control data processing apparatus having primary and secondary card paths with a single data sensing device in each of these card paths.

Still another object of the invention is to provide record card control data processing apparatus where the data derived from the record cards is encoded into a particular collatable code and then transferred to storage; the data in storage is then subsequently read out and checked and, if certain conditions are found to exist, circuitry is provided to generate additional data which together with the original data is transferred to a second area within data storage.

A more specific object of the invention is to provide record card control data processing apparatus where the data derived from the record cards is encoded into a collatable code and thereafter the data is processed serial by bit and serial by character.

Another more specific object of the invention is to provide record card control data processing apparatus which includes mode control circuitry operably controlled by the apparatus for processing the data character by character.

Another specific object of the invention is to provide record card control data processing apparatus which requires a minimum amount of control panel wiring.

Still another specific object of the invention is to provide record card control data processing apparatus which has improved reliability.

The foregoing and other objects, features and advantages of the invention will be apparent from the following more particular description of a preferred embodiment of the invention, as illustrated in the accompanying drawings.

In the drawings:

FIG. 1 is a view diagrammatically showing a record card controlled machine embodying the invention;

FIGS. 2*a* and 2*b*, with FIG. 2*a* disposed above FIG. 2*b*, taken together, constitute a more detailed schematic showing of the record card controlled machine of FIG. 1;

Figure 10A:
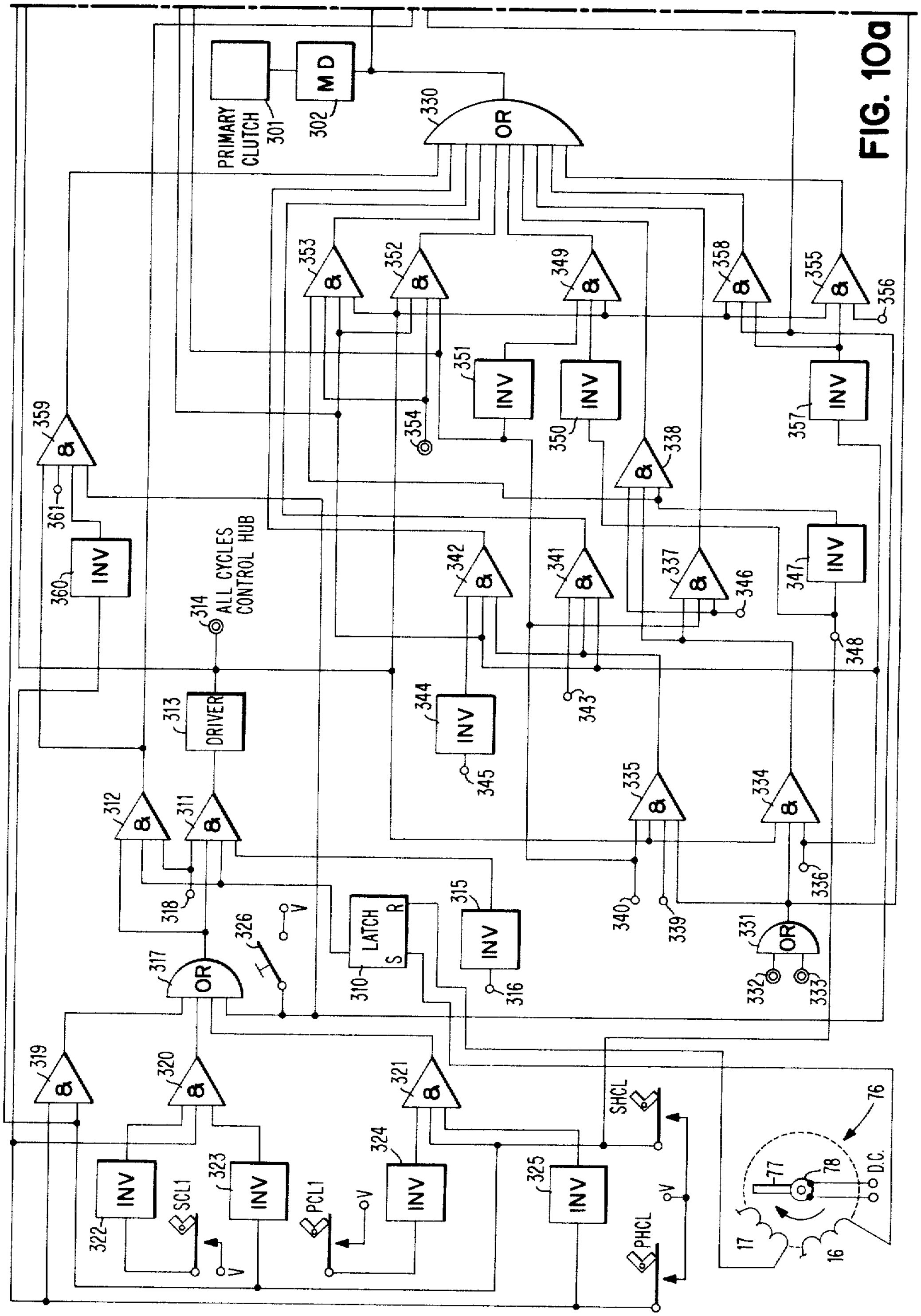
Figure 10B:
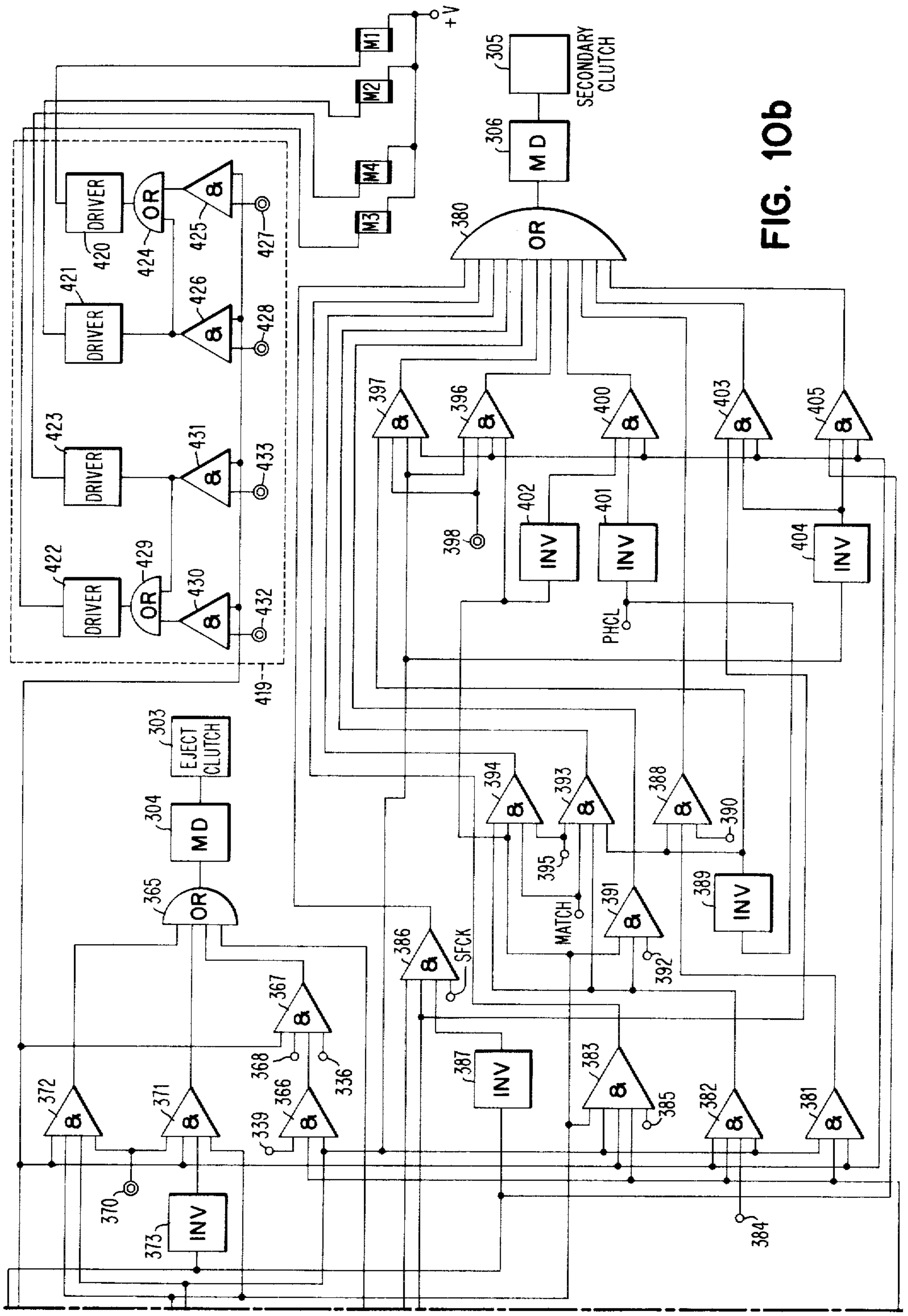
Figure 11:
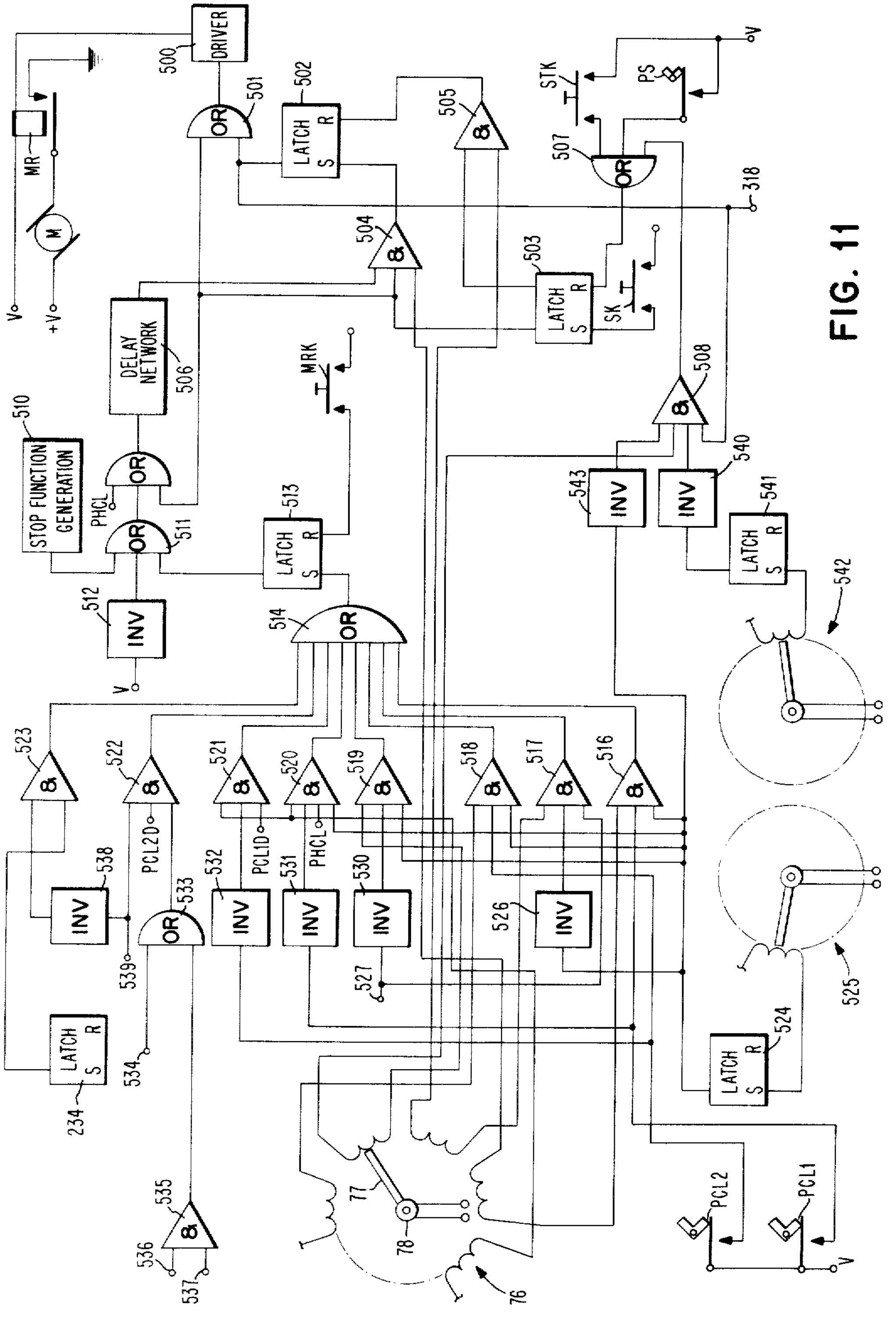
Figure 16:
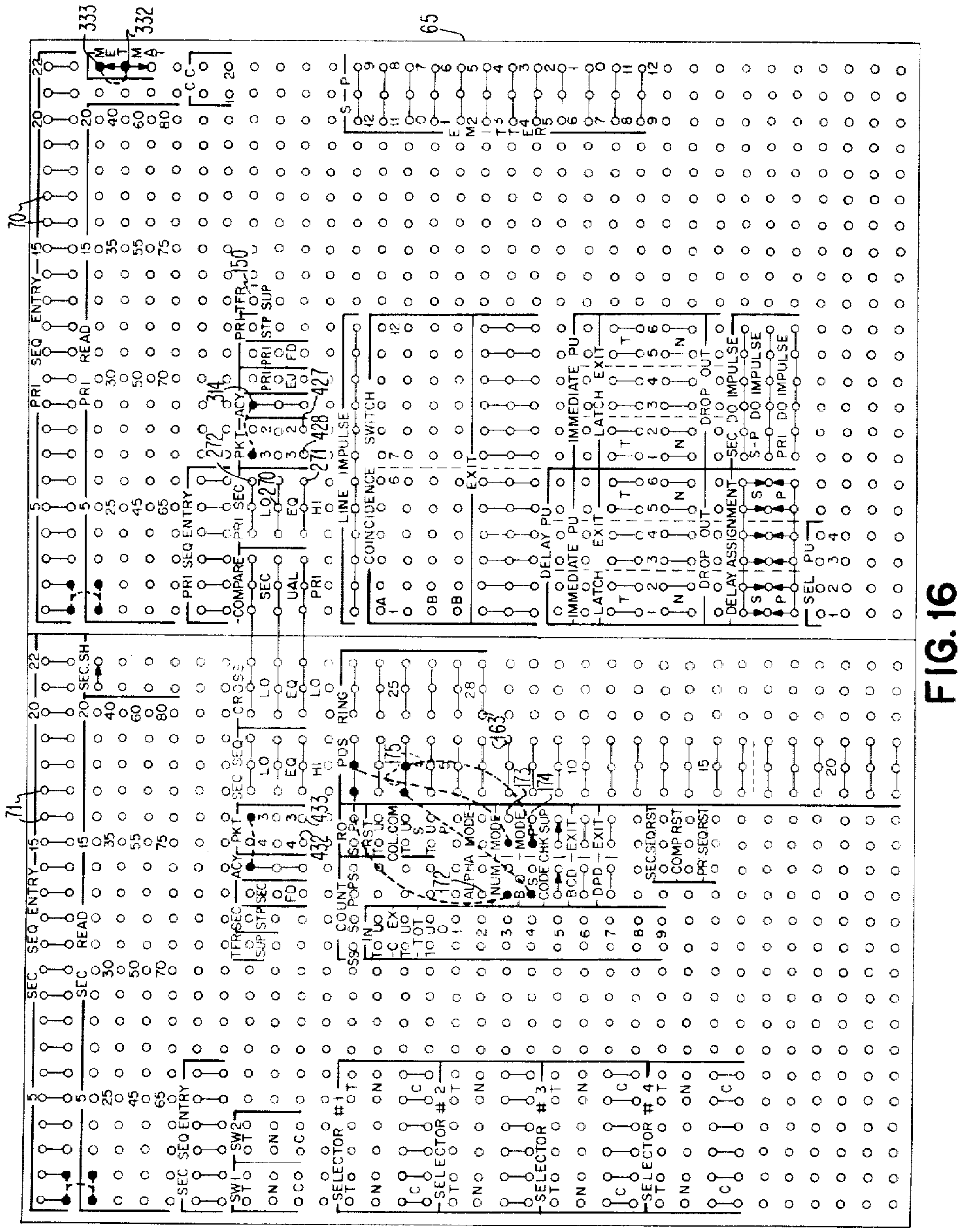

FIGS. 10*a* and 10*b*, with FIG. 10*b* disposed to the right of FIG. 10*a*, when taken together, represent a view schematically showing the clutch control and card pocket control circuitry;

FIG. 11 is a schematic circuit diagram of the start and stop controls;

FIG. 12 is a diagram illustrating the collatable code;

FIG. 13 is a diagram showing the timing of the electrical impulses provided by the magnetic pulse generator and as related to card timing;

FIG. 14 is a timing diagram showing the periods for reading data from the record cards into data storage, for data comparing and answer sampling, for controlling the clutch and pocket magnets and for transferring data within data storage;

FIG. 15 is a timing diagram showing the timing for the card hopper contacts, card levers and sensing brushes;

FIG. 16 is a diagram showing the various plug hubs of the control panel and the control panel wires plugged for a merge operation; and, FIGS. 17 to 28 diagrammatically illustrate the operation of the machine for a merge application.

*General*

Figure 1:
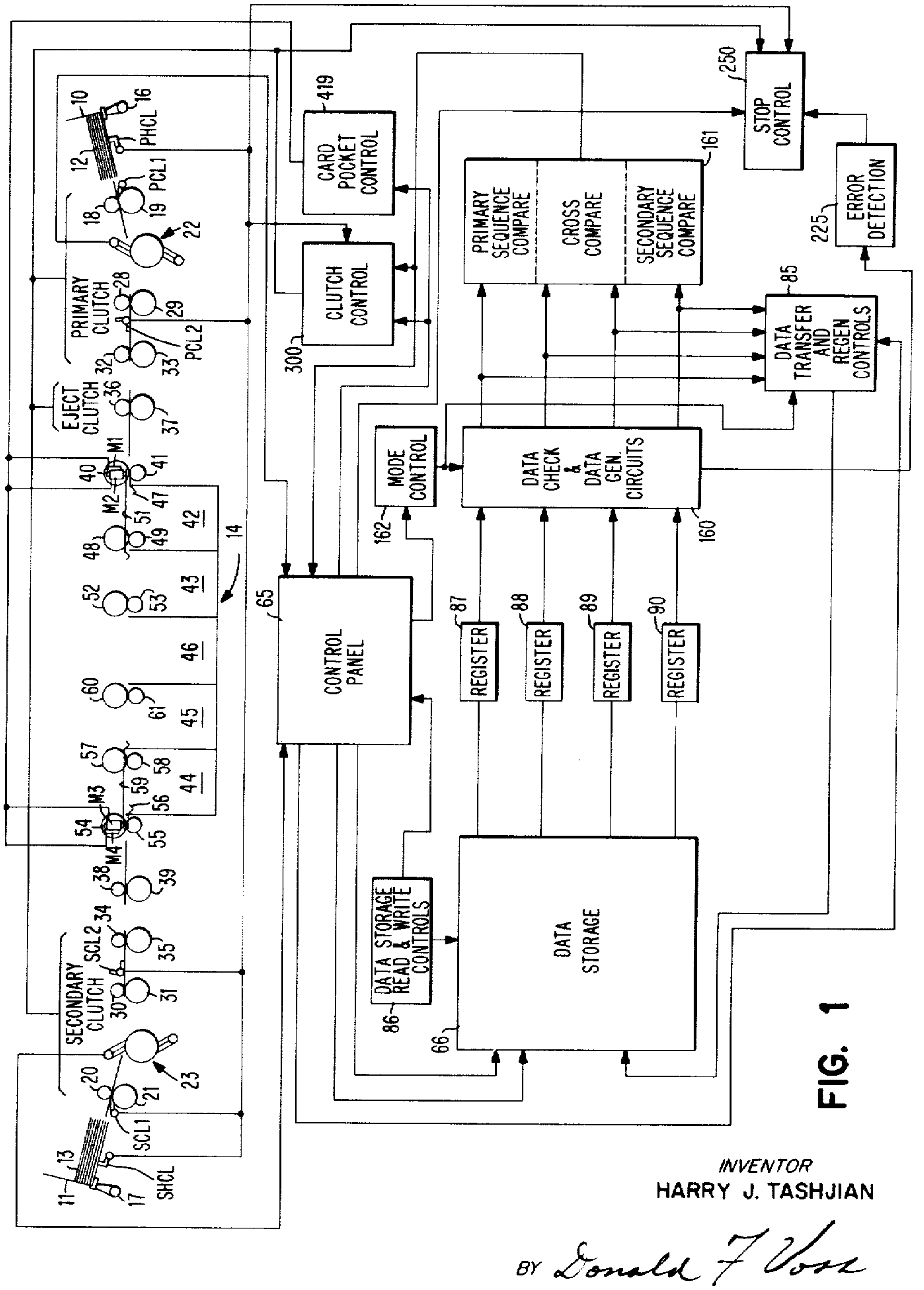

The record card control data processing apparatus embodying the present invention is shown schematically by way of example in FIG. 1 as a collator having arbitrarily designated primary and secondary card hoppers 10 and 11, for containing primary and secondary cards 12 and 13, respectively. In this example, the record cards 12 and 13 are of the type having 960 index positions arranged in twelve rows and 80 columns according to the well-known Hollerith code. Data is represented in coded form by way of perforations entered into the cards at discrete index positions in the well-known manner.

The functions of the collator are to analyze the data entered in coded form into the primary and secondary cards 12 and 13, and in response to the analysis made, distribute the primary and secondary cards in a particular order in one or more card-stacking receptacles generally indicated by reference character 14. The individual card-stacking receptacles will be identified and described in detail later herein.

In order to analyze the data entered in coded form in the primary and secondary record cards 12 and 13, the same are selectively advanced in seriatim from their record card hoppers 10 and 11 by means of conventional clutch-controlled card picker knives 16 and 17, respectively. The selective operation of the picker knives 16 and 17 enables either non-simultaneous or simultaneous advancement of the primary and secondary cards from their respective card hoppers 10 and 11. As will be described hereinafter, controls are provided for card run-in and runout to initiate and terminate operations.

Figure 2A:
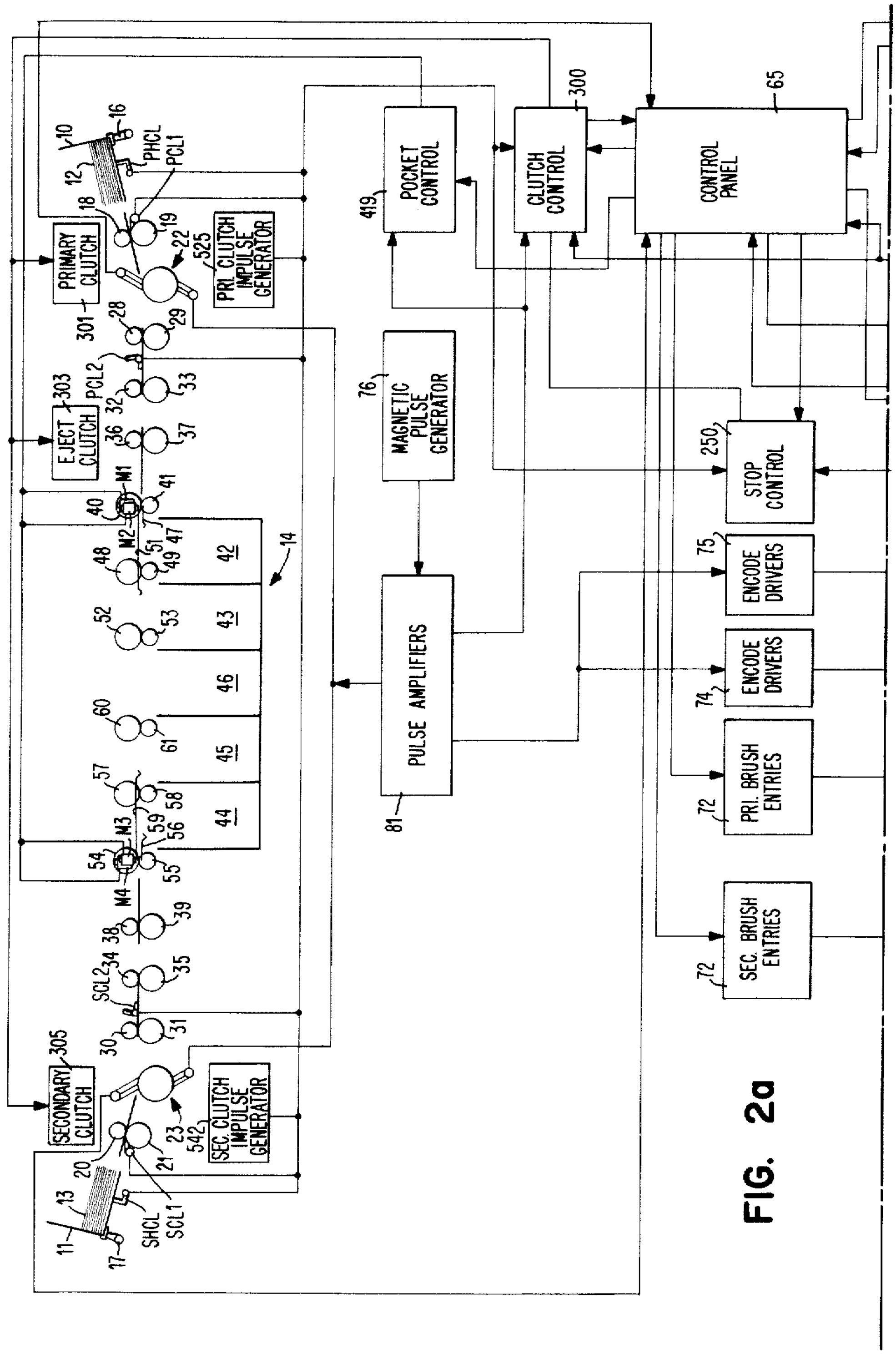

Clutch-controlled pairs of cooperating feed rollers 18 and 19 and 20 and 21 are suitably disposed so as to receive the primary and secondary cards 12 and 13 advanced from card hoppers 10 and 11 by picker knives 16 and 17, respectively. The pairs of cooperating feed rollers 18 and 19 and 20 and 21 advance the primary and secondary cards 12 and 13 relative to brush sensing the devices 22 and 23, respectively. The brush sensing devices 22 and 23 are of the conventional type, each consisting of 80 parallelly positioned sensing brushes so as to be in contact with a common contact roller. A single common brush, FIG. 2*a*, is also in contact with each contact roller.

Pairs of clutch-controlled cooperating feed rollers 28 and 29 and 30 and 31 are positioned to receive the primary and secondary cards 12 and 13 after they have been passed relative to the sensing devices 22 and 23. The primary and secondary cards are advanced by the pairs of cooperating feed rolls 28 and 29 and 30 and 31 to pairs of clutch-controlled cooperating feed rolls 32 and 33 and 34 and 35. The pair of cooperating feed rolls 32 and 33 then advance the primary cards to another set of cooperating feed rolls 36 and 37; however, these feed rolls are controlled by an independent clutch which, in this example, is designated an eject clutch. The secondary cards are advanced by cooperating feed rollers 34 and 35 to another pair of cooperating feed rollers 38 and 39; this pair of cooperating feed rollers being clutch controlled by the same clutch controlling the previously mentioned cooperating feed rollers for feeding the secondary cards.

The cooperating feed rollers 36 and 37 feed the primary cards to cooperating feed rollers 40 and 41 which are continuously running. The cooperating feed rollers 40 and 41 advance the primary cards relative to the card-stacking receptacles. In this example, there are five card-stacking receptacles. Card-stacking receptacles 42 and 43 are adapted to receive only primary record cards while card-stacking receptacles 44 and 45 are adapted to only receive secondary cards, and card-stacking receptacle 46 is adapted to receive both primary and secondary cards for card merging operations. Primary record cards are automatically directed into card-stacking receptacle 42 by means of a chute blade or guide 47, FIG. 2*a*, unless the same is moved out of the card path by means of control magnet M1. If the control magnet M1 is energized, the primary cards will be advanced by cooperating feed rollers 40 and 41 to another pair of cooperating feed rollers 48 and 49 and will be directed into the card-stacking receptacle 43 under control of a guide or chute blade 51. Chute blade 51 is operably controlled by a magnet M2 which, when energized in conjunction with magnet M1, will permit the cards to be advanced by cooperating feed rollers 48 and 49 to cooperating feed rollers 52 and 53 which feed the primary cards into the card-stacking receptacle 46.

Similarly, cooperating feed rollers 38 and 39 feed secondary cards to cooperating feed rollers 54 and 55 which are continuously running feed rollers. As the secondary cards are fed by cooperating feed rollers 54 and 55, they will be automatically deflected into card-stacking receptacle 44 by means of chute blade 56, FIG. 2*a*, which is operably controlled by a magnet M3. If magnet M3 is energized, the chute blade 56 is retracted out of the card path so that the secondary cards are advanced by cooperating rollers 54 and 55 to another set of continuously running cooperating feed rollers 57 and 58 which advance the cards so that they are deflected by chute blade 59 into card-stacking receptacle 45. Chute blade 59 is operably controlled by a magnet M4, which, when energized together with the energization of magnet M3, will permit the secondary cards to be advanced by the cooperating feed rollers 57 and 58 to a pair of cooperating feed rollers 60 and 61 which will advance the cards into card-stacking receptacle 46.

Primary and secondary hopper contacts PHC and SHC are positioned relative to the card hoppers 10 and 11 so as to provide an indication as to whether or not there are primary and secondary cards in the card hoppers. Similarly, both the primary and secondary card feed paths are provided with pairs of spaced apart card-operated contacts PCL1, PCL2, and SCL1, SCL2 which function to indicate the presence or absence of record cards in the primary and secondary card feed paths at discrete positions.

The data sensed by the brush sensing devices 22 and 23 is transferred via the control panel 65 to data storage or a magnetic core storage matrix 66. Generally speaking, it is only necessary to check fields of data, i.e., groups of columns of data, entered into the primary and secondary cards. In this example, any 28 columns of each primary and secondary card may be transferred to magnetic core data storage 66. This is accomplished by control panel wiring in a well-known manner. The 80 sensing brushes of the sensing devices 22 and 23 are internally wired to 80 primary read plug hubs and to 80 secondary read plug hubs of control panel 65, as in FIG. 3. The control panel 65 is provided with 28 primary sequence entry plug hubs and 28 secondary sequence entry plug hubs. Conventional control panel or plug wires are then utilized to establish connections between the primary read plug hubs and the primary sequence entry plug hubs and the secondary read plug hubs with the secondary sequence entry plug hubs. The primary sequence entry plug hubs and the secondary sequence entry plug hubs are internally wired to electrical conductors threading magnetic cores of the areas designated primary sequence storage and secondary sequence storage 67 and 68, respectively, FIGS. 2*b* and 3.

*Data encoding*

The data derived from the primary and secondary cards is represented by the Hollerith code; however, when it is transferred into data storage 66, it is directly encoded into an alphanumeric collatable code as represented in FIG. 12. The collating sequence is blanks, 12, 11, 0/1, A to and 0 to 9. The complete code has ten bit positions arbitrarily designated E, D, C, B, A, 0, 11, 12, G2 and G1. Data represented by the Hollerith code is directly translatable into data represented by bits in bit positions E through 12; however, for the bit positions G2 and G1, used for coding blanks, 12's, 11's and 0/1's circuitry is provided to recognize these conditions and generate the G2 and G1 bits as necessary.

A glance at FIG. 12 indicates that a combination of two bits in the bit positions E through A is utilized to represent numeric characters 1 to 9. A single bit in the bit positions 0, 11 and 12 is utilized to represent a numeric 0 and a combination of two bits in the bit positions E through A and one bit in the bit positions 0, 11 and 12 is utilized to represent the alphabetic characters A through Z. A combination of two bits in the bit positions E through A and one bit in the bit positions 0, 11 and 12 and one bit of the generated bits is utilized to represent the 0–1 condition. Combinations of one bit in the 0, 11 and 12 bit positions and a bit in one of the generated bit positions are utilized to represent the 11 and 12 and the combination of a bit in each of the generated bit positions is utilized to represent a blank.

Figure 6:
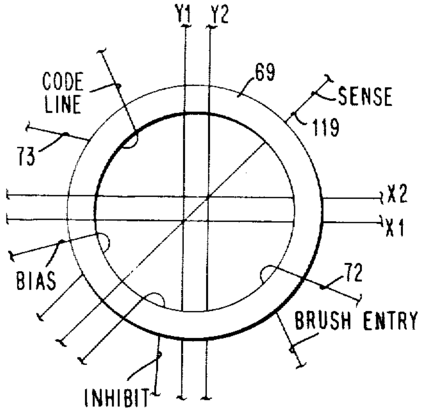
FIG. 6 is an enlarged view schematically showing a typical magnetic core of data storage and the windings threading therethrough.

The electrical conductors threading any one of the magnetic cores 69 in the primary sequence or secondary sequence storage is represented in FIG. 6. The use of magnetic cores to store bits of data is so well known that a description of the phenomena involved will not be given. However, the operation of the magnetic core matrix is based upon the well-known principle of utilizing half-select currents for reading and writing and the use of an inhibit winding for writing. In this example, the conductors threading a magnetic core 69 from the primary sequence entry hubs 70, FIG. 3, or from the secondary sequence entry hubs 71 provide only a portion of the current necessary to switch the particular magnetic core from one stable state to another stable state. These conductors correspond to the conductor or winding 72 labeled brush entry, in FIG. 6. A conductor 73 designated code line, FIGS. 3 and 6, is also utilized to provide a portion of the current which, in combination with the portion of the current provided by the brush entry conductor 72, is sufficient to enable the magnetic core 69 to switch from one stable state to another stable state and thereby represent the encoded data.

In this example, 490 milliampere turns are required to switch the state of the magnetic core 69. The electrical impulses from the sensing brushes over brush entry conductors 72 provide an excitation of 390 milliampere turns. The code line 73 is driven from a source, which will be described later herein, to provide an excitation of 364 milliampere turns. It is seen that the milliampere turns provided by the brush entry winding 72 together with the milliampere turns provided by the code line 73 is more than sufficient to switch the state of the magnetic core 69. This excess of milliampere turns is provided to insure switching of the magnetic cores 69 in spite of variations in power supply voltages and contact resistance at the control panel hubs and sensing brushes. However, because each winding does carry an excess of milliampere turns, a bias winding is provided to furnish 200 milliampere turns of excitation in such a direction as to cancel part of the excitation furnished by the brush entry and code windings. While normally 490 milliampere turns are required to switch a core, an excitation as small as 300 milliampere turns may cause a core to switch its magnetic state. Since a valid switching of a magnetic core requires both an impulse on the code line and an impulse on the brush entry line, a continuous current provided by the bias winding prevents either the code line alone or the brush line alone from switching the magnetic core.

Figure 3:
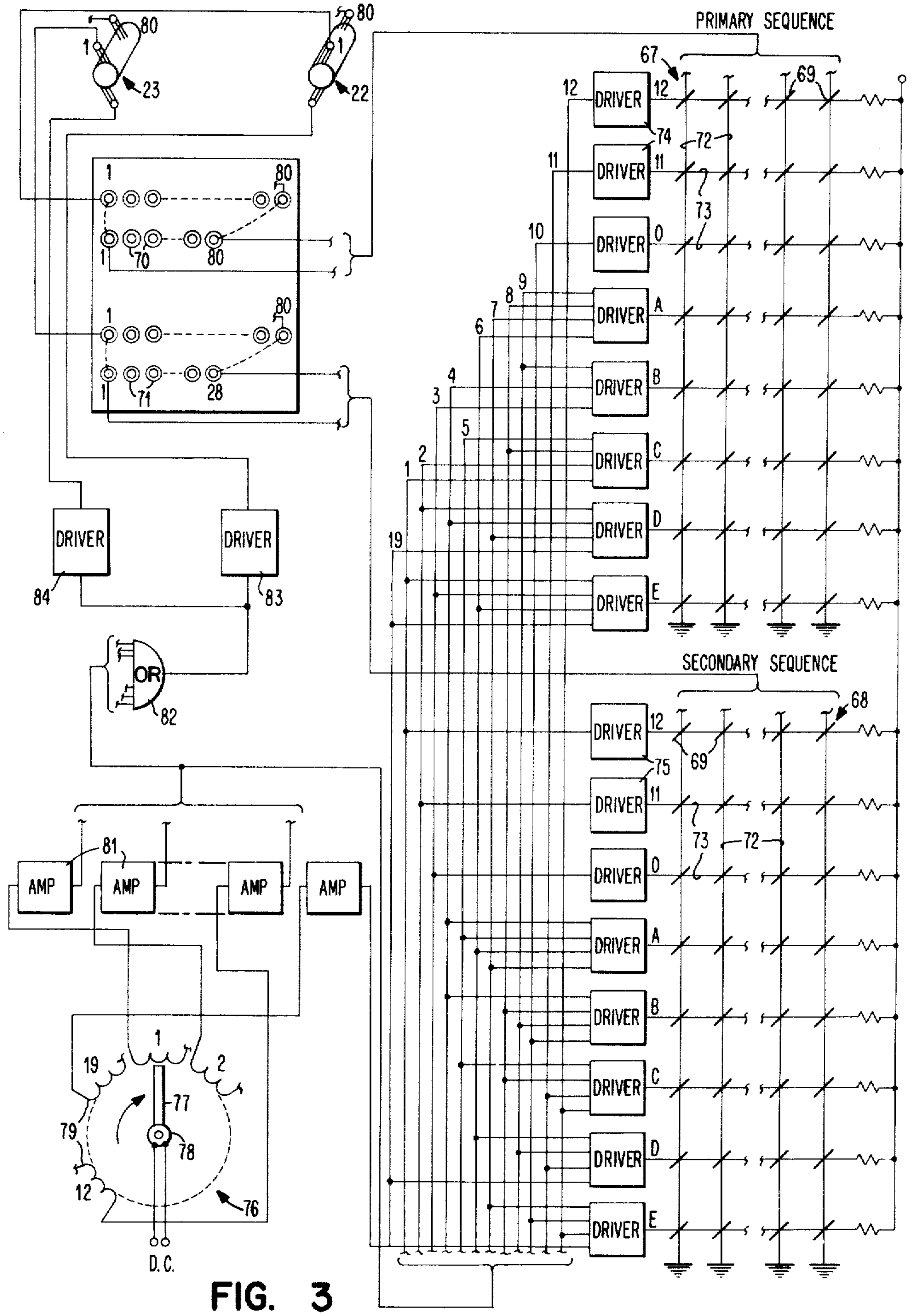
FIG. 3 is a schematic diagram of the circuitry for encoding data coming from the sensing brushes via the control panel into data storage.

The electrical impluses applied to the code lines 73 come from primary and secondary encoding drivers 74 and 75, respectively, shown in FIG. 3. The encoding drivers 74 and 75 are under control of impulses furnished by a magnetic pulse generator 76. The magnetic pulse generator 76 is of the type well known in the art and this example consists of a continuously rotating iron vane 77 rotating about a stationary coil 78 carrying direct current. A stationary concentric ring of magnetic material, not shown, is provided with nineteen arcuately spaced coils 79. As the iron vane 77 moves past each coil 79, the magnetic flux therein changes rapidly to induce a voltage in the coil. The first coil winding is positioned so as to generate an impulse at approximately 12° of a machine cycle; the first twelve windings of the nineteen windings of the magnetic pulse generator are spaced 18° apart, thereby providing impulses, starting at 12°, at 18° intervals with the twelfth impulse occurring at 210°, as seen in FIG. 13. The impulses provided by the coil winding 79, numbered 13 to 19, will be described later herein.

Before describing how the impulses from the magnetic impulse generator 76 are furnished to the encoding drivers 74 and 75, it should be noted that, in order to merge primary and secondary cards 12 and 13 into card-stacking receptacle 46 from opposing primary and secondary card hoppers 10 and 11, it is necessary to feed the primary and secondary cards with different leading edges; and, in this example, the primary cards are fed with the "9" row facing the leading edge while the secondary cards are fed with the "12" row facing the leading edge. Hence, with reference to FIG. 3, it is seen that the first coil winding 79 of the magnetic pulse generator 76 is connected to the encode driver 74 for the bit position C and to encode driver 74 for bit position E of primary sequence storage 67, while it is connected only to the encode driver 75 for the bit position 12 of the secondary sequence storage 68. By analyzing the connections to the drivers and referring to the collatable code of FIG. 12, it will be seen that each encode driver of encode drivers 74 and 75 is impulsed by the magnetic pulse generator 76 at the proper time so that the data represented by the Hollerith code will be translated directly in core storage in coded form as represented by the collatable code of FIG. 12. Electrical power is furnished to the common brushes of the sensing devices 22 and 23 at discrete time intervals by means of the magnetic impulse generator 76. The twelve windings of the magnetic impulse generator 76 used for encoding the data also provide timed electrical impulses via amplifiers which have their outputs also connected to inputs of a logical OR circuit 82. The output of the logical OR circuit 82 is connected to inputs of brush drivers 83 and 84 for supplying power to the common brushes of sensing devices 22 and 23, respectively. The electrical impulses developed by the magnetic pulse generator 76 are synchronized with the passage of the row positions of the cards relative to the sensing brushes. In this manner, no arcing occurs at the sensing brushes because current can flow only after the brushes are in firm contact with the contact roller for any perforation in the record cards.

Figure 2B:
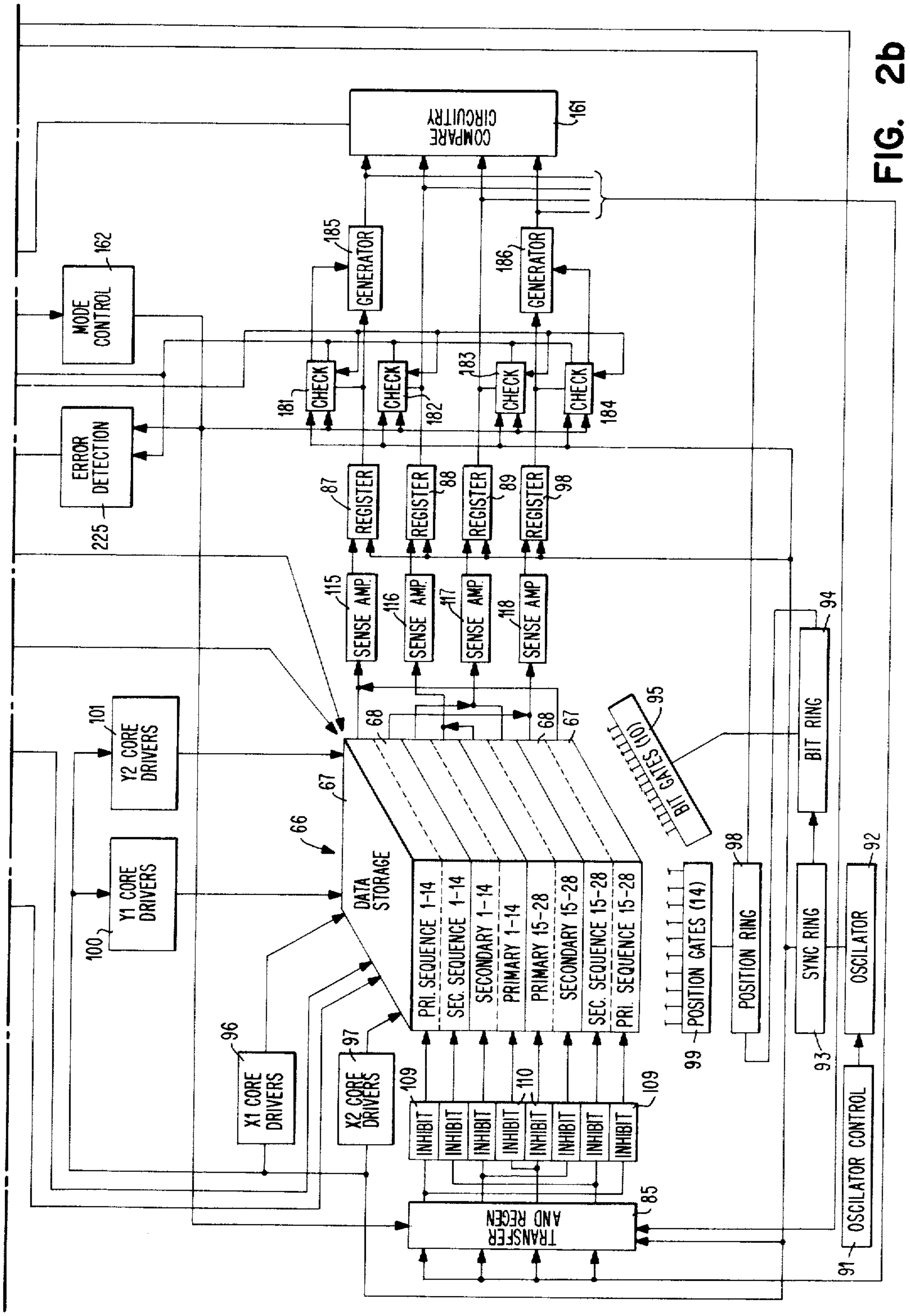

In this example, primary sequence storage 67 and secondary sequence storage 68, FIG. 3, are each divided into two core planes, FIG. 2*b*; primary sequence storage 67 utilizes core plane one for storage positions 1–14 and core plane eight for positions 15–28, while secondary sequence storage utilizes core plane two for positions 1–14 and core plane seven for positions 15–28. The reason for utilizing two core planes, each having fourteen storage positions, instead of a single core plane having 28 storage positions, is one of economy. This will be specifically explained later herein. It should be noted that each storage position of primary sequence storage and secondary sequence storage has eight bit positions for the bits E to 12.

*Data transfer and regeneration*

Data entered into the primary sequence and secondary sequence storage 67 and 68 is subsequently read out therefrom, in a manner to be described shortly, and entered into primary and secondary storage, where primary storage occupies core plane four for positions 1–14 and core plane five for positions 15–28; and secondary storage occupies core plane three for positions 1–14 and core plane six for positions 15–28. In both primary and secondary storage, there are two additional cores per position for storing the generated bits G1 and G2. Data is not entered into the primary and secondary storage areas from the brush sensing devices 22 and 23; rather, primary and secondary storage receives data transferred from primary sequence storage and secondary sequence storage, respectively.

Data is transferred from primary sequence storage and secondary sequence storage to primary and secondary storage during a period starting at 285° of a machine cycle and terminating approximately at 333° of the same machine cycle. The transfer of data from primary sequence and secondary sequence storage to primary and secondary storage is under control of data transfer and data regeneration controls 85, FIGS. 1 and 2*b*, which, in combination with data storage read and write controls 86, FIG. 1, effect the transfer of data. The data storage read and write controls 86 are also operative during the readout of data from data storage serial by bit and serial by character simultaneously from primary sequence, secondary sequence, primary and secondary storage to respective data storage registers 87, 88, 89 and 90. This readout of data occurs approximately from 222° of one machine cycle to 270° of the same machine cycle and is defined as the period for data comparison and answer sample.

The data storage read and write controls 86 are shown schematically in FIG. 2*b* as an oscillator control 91 for controlling the operation of an oscillator 92. Generally speaking, the oscillator control 91 enables the oscillator to emit electrical impulses at a predetermined frequency during the period for reading out data from data storage 66 for data comparison and answer sampling and during the period for enabling data transfer from primary sequence and secondary sequence storage to primary and secondary storage.

The ouput from the oscillator 92 is supplied to the input of a 4-position synchronizing ring 93 which furnishes four discrete sequentially occurring electrical impulses, each impulse having a duration of eight microseconds. The outputs from the synchronizing ring 93 are designated 1S, 2S, 3S and 4S. The output from the last or fourth position of the synchronous ring 93 is connected to an input of a 10-position bit ring 94 which has ten outputs for emitting ten discrete sequentially occurring electrical impulses, each impulse having a duration equivalent to the time duration of four sync pulses or 32 microseconds. Accordingly, for every bit impulse, there are four sync pulses. The bit ring 94, as will be seen shortly, functions to control bit gates 95 for the X1, X2 read and write drivers 96 and 97.

The output of the last or tenth position of the bit ring 94 is connected to the input of a position or column ring 98 having fourteen outputs for providing fourteen discrete sequentially occurring electrical impulses, each having a time duration equal to that of ten electrical impulses from the bit ring, which equals 320 microseconds. While the position ring 98 has only fourteen outputs, circuitry is provided for developing twenty-eight sequentially occurring discrete electrical impulses from the position ring 98. Among the many functions of the position ring 98, the outputs therefrom are utilized to control fourteen position gates 99 for gating Y1, Y2 core drivers 100 and 101, respectively.

Figure 4:
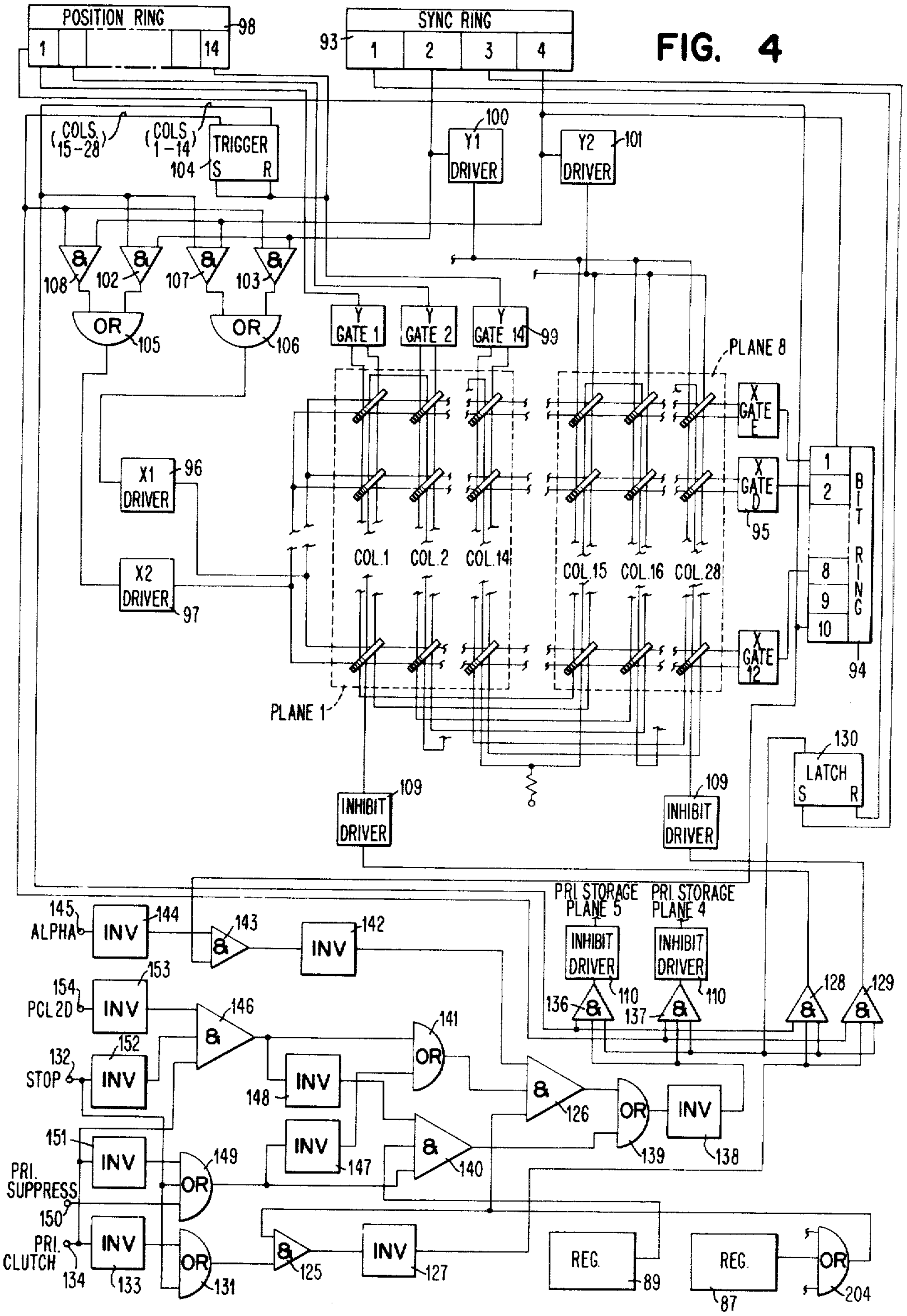
FIG. 4 is a schematic diagram of the circuitry for effecting readout of data from core storage, data regeneration and data transfer within core storage.

Only two of the core drivers; i.e., one X driver and one Y driver, of core drivers 96, 97, 100 and 101 are utilized at any one time. Essentially, selection of the particular core drivers is accomplished under control of the sync ring 93. These controls and the details of the data transfer and regeneration controls 85 are shown in FIG. 4. In this example, current flows with respect to drivers Y1 and X2 so as to effect a reading of the cores in columns 1 through 14 without having any effect in columns 15 through 28. Of course, before current can flow from drivers Y1, X2, it is necessary that the associated bit gates 95 and position gates 99 be rendered operative. Reading in columns 15 through 28 is accomplished by drivers Y1, X1; however, these drivers, when operative, do not have any effect in columns 1 through 14. The drivers 96, 97, 100 and 101 function for both reading and writing of data. The particular combination of drivers energized determines whether reading or writing takes place. When reading a magnetic core, current is supplied by two of the drivers, each supplying approximately half of the current necessary to switch the state of the core. The direction of the current supplied by the selected drivers is such that it tends to set the core in the "zero" state. Hence, if a core had been in the "zero" state prior to being read, then, when the core is read, there will be no change in state and there will not be an output on the sense winding 119, FIG. 6, which threads the core. If the core had been in the "one" state, it would switch to the "zero" state upon being read and an output signal would be present on the sense winding 119. Drivers Y1 and X2 furnish the necessary current for reading the cores sequentially by bit and character position for positions 1 to 14, inclusive, and drivers Y, X provide the current for reading the cores for positions 15 to 28, inclusive.

Reading of data from data storage 66 takes place at sync 2 time. Accordingly, the output from the second position of the sync ring 93 is connected to inputs of logical AND circuits 102 and 103 and to the input of the Y1 core driver 100. The logical AND circuit 102 has another input connected to the output associated with the reset terminal of a trigger 104. Both the set and reset terminals of the trigger 104 are commonly connected to the output of the last or fourteenth position of the position ring 98. The trigger 104 is initially reset; hence, as the position ring 98 goes through all fourteen positions for the first time, the outputs then will be 1 to 14. After the fourteenth output occurs, the trigger 104 is switched and, as the position ring 98 runs through all fourteen positions for a second time, the outputs therefrom will be 15 to 28. Hence, logical AND circuit 102 will be conditioned at sync 2 time for positions or columns 1–14 at each bit time to select the X2 driver 97. The output of the logical AND circuit 102 is connected to an input of a logical OR circuit 105 having its output connected to the X2, driver 97. Logical AND circuit 103 has another input connected to the output associated with the set side of trigger 104. The output of logical AND circuit 103 is connected as an input to a logical OR circuit 106 having its output connected to the X1 core driver 96. Hence, for columns 15–28, logical AND circuit 103 will be conditioned to activate the X1 driver 96. Of course, the Y1 driver will be activated every sync 2 time for every bit time for positions 1–28.

The core drivers 96, 97, 100 and 101 are also utilized to write or enter data into data storage. Writing in data storage takes place during sync 4 time. During a writing operation, the Y2 driver 101 is active for every sync 4 time. The X1 driver 96 is active at sync 4 time for columns 1–14 and the X2 driver 97 is active at sync 4 time for columns 15–28. The output from the fourth position of the sync ring 93 is connected to the Y2 driver 101 and to inputs of logical AND circuits 107 and 108. Logical AND circuit 107 also has an input connected to the output associated with the reset side of trigger 104. The output of logical AND circuit 107 is connected to an input of logical OR circuit 106. Hence, the X1 driver 96 will be activated every sync 4 time for every bit time for positions 1–14. Logical AND circuit 108 has an input connected to the output associated with the set side of trigger 104. The output of logical AND circuit 108 is connected to an input of a logical OR circuit 105. Accordingly, the X2 core driver 97 will be activated at sync 4 time for every bit time for positions 15-28 to enable writing in columns 15-28 of core storage for all planes.

Whether or not writing takes place within core storage is under control of inhibit drivers, there being an inhibit driver for each core plane; i.e., eight inhibit drivers. The data transfer and data regeneration circuitry 85 controls the inhibit drivers 109 and 110 for primary sequence storage and primary storage, respectively. The inhibit drivers for secondary sequence storage and secondary storage are similarly controlled. Basically, the inhibit drivers 109 and 110 are turned on whenever data is not to be written into a particular storage position or magnetic core. This is necessary because writing into core storage is automatic and, during regeneration of data into core storage, it would be undesirable to write data into a core when none should be written.

Generally speaking, the inhibit drivers 109 and 110, as well as the inhibit drivers for the secondary sequence storage and secondary storage, are utilized to enable the regeneration of data within the same position of data storage 66 and to effect the transfer of data from one storage location in one core plane to another storage location in another core plane. Regeneration of data within the same positions of core storage takes place during one discrete time interval or period and the transfer of data within core storage takes place at another discrete time interval or period. These discrete time intervals are provided by electrical control impulses produced by the magnetic pulse generator 76. In order for the data to be regenerated within the same positions of core storage, it is first necessary to read the data from data storage 66 to the registers 87 and 88, 89 and 90, FIG. 2*b*. The registers 87, 88, 89 and 90 are single-bit registers, each register being a trigger having a reset terminal connected to the output of the first position of the sync ring 93. The set terminals of the registers 87, 88, 89 and 90 are connected to the outputs of associated sense amplifiers 115, 116, 117 and 118, respectively, as seen in FIG. 2*b*. While primary sequence storage, secondary sequence storage, primary storage and secondary storage, each involve two core planes, a single sense winding threads all of the cores of the two core planes making up primary sequence storage, secondary sequence storage, primary storage and secondary storage. The sense windings for primary sequence storage, secondary sequence storage, primary storage and secondary storage are connected to the sense amplifiers 115, 116, 117 and 118, respectively. A typical sense winding 119 is shown in FIG. 6. A voltage is induced in the sense winding 119, FIG. 6, whenever the magnetic state of a particular magnetic core is switched. The sense amplifiers 115, 116, 117 and 118 are sensitive to the voltage induced in the sense windings and amplifies the same, the amplified voltage then sets the associated register. In this example, each magnetic core has a zero state and a one state. When a magnetic core is in the zero state, it does not contain a bit of information whereas, if it is in the one state, it does. Hence, when a bit of information is written into a magnetic core, the core is switched to the one state. Further, when a core is read, if it is in the one state, it will be switched to the zero state, upon being read. A core in the zero state, when read, will remain in the zero state. Hence, during regeneration of data within data storage 66, only those cores which had been in the one state prior to reading should be returned to the one state while the remaining cores should be maintained in the zero state.

Reading of data within core storage 66 takes place during sync 2 time for each bit. If data is read at that particular time, then the associated registers 87, 88, 89 and 90 will be set. Hence, the registers provide an indication as to whether or not a bit of data has been read out of core storage 66 and are thus utilized to control the inhibit drivers because the inhibit drivers must be utilized to restore the states of the cores that they had prior to data readout. The writing of data into core storage 66 takes place during sync 4 time, sync 3 time is utilized to sample the condition of the registers 87, 88, 89 and 90 for checking and answer generation purposes.

The period for sampling the registers 87, 88, 89 and 90 for the purposes of data comparing lasts from approximately 222° to 270° of a machine cycle. During this period, each bit of each character for each column, there being 28 columns, is read out sequentially from data storage 66 to the registers 87, 88, 89 and 90. The data read out during this time is regenerated back into core storage 66. Essentially, if one of the registers is set, then the inhibit driver that it controls will not be rendered operative so as to inhibit the writing process whereas, if the register is not set, the inhibit driver under control of that particular register will be rendered operative to provide an electrical impulse approximately one-half of the required write excitation current in a direction opposite to that of the right direction so that the core to be switched during the write process at that particular time cannot be switched. For example, the output of the primary sequence register 87 is connected to the inputs of logical AND circuits 125 and 126, FIG. 4. The output of logical AND circuit 125 is connected to the input of an inverter 127 having its output connected to the inputs of logical AND circuits 128 and 129. The outputs of logical AND circuits 128 and 129 are connected to inhibit drivers 109. The inhibit drivers 128 and 129 are gated under control of a latch 130 which has its output associated with the set side thereof connected to the inputs of logical AND circuits 128 and 129. The set terminal of latch 130 is connected to the output of position 3 of the sync ring 93 and the reset terminal is connected to the output of position 1 of the sync ring 93. Hence, the latch 130 will be set during sync 3 and 4 time and will be reset at sync 1 time or at the end of sync 4 time. Logical AND circuit 128 controls the inhibit driver 109 during position 1 time to position 14 time and, accordingly, has an input connected to the output of trigger 104 associated with the reset side thereof. Logical AND circuit 129 has another input connected to the output of trigger 104 associated with the set side thereof so as to be active for columns or positions 15–28.

Logical AND circuit 125 which essentially controls logical AND circuits 128 and 129 has another input connected to the output of a logical OR circuit 131. The logical OR circuit 131 has one input connected to the terminal 132 for receiving a stop impulse and an input connected to the output of an inverter 133. The inverter 133 has its input connected to a terminal 134 for receiving a signal for actuating the primary clutch.

Inhibit drivers 110 function to provide an inhibiting current in the cores of primary storage or the cores in planes four and five and are under control of logical AND circuits 136 and 137, FIG. 4. Logical AND circuit 136 has one input connected to the output of latch 130, another input connected to the output of trigger 104 associated with the reset side thereof, so as to be on for columns 1–14, and an input connected to the output of an inverter 138. Logical AND circuit 137 has an input connected to the output of latch 130, an input connected to the output of trigger 104 associated with the set side thereof, so as to be on for columns 15–28, and an input connected to the output of inverter 138.

The input of inverter 138 is connected to the output of a logical OR circuit 139 having an input connected to the output of logical AND circuit 126 and an input connected to the output of the logical AND circuit 140. Hence, the inverter 138 is under control of logical AND circuits 126 and 140.

Logical AND circuit 126, in addition to the input connected to the output of a logical OR circuit 204, which will be discussed shortly in connection with the data checking and bit generation circuitry of FIG. 5, also has an input connected to the output of a logical OR circuit 141 and an input connected to the output of an inverter 142. One of the inputs of logical OR circuit 204 is connected to the output of the primary sequence register 87; hence, as it will be seen shortly, logical AND circuit 126 has an input from the primary sequence register even for generated bits.

The inverter 142 has its input connected to the output of a logical AND circuit 143 having an input connected to the tenth position of the bit ring 94 and an input connected to the output of an inverter 144. The inverter 144 has its input connected to a terminal 145 for receiving a signal indicating that the machine is operating in the alphabetic mode; the apparatus for operating the machine in different modes will be described later herein.

Logical OR circuit 141 has an input connected to the output of the logical AND circuit 146 and an input connected to the output of inverter 147. The output of logical AND circuit 146 is also connected to the input of an inverter 148 having its output connected to the input of logical AND circuit 140. Logical AND circuit 140 also has an input connected to primary register 89 and an input connected to the output of the logical OR circuit 149. The output of logical OR circuit 149 is also connected to the input of inverter 147. Logical OR circuit 149 has an input connected to a terminal 150 for receiving primary suppress signal, an input connected to the terminal 132 for receiving any stop signal and an input connected to the output of an inverter 151 having its input connected to terminal 134. Logical AND circuit 146 has an input connected to the output of an inverter 152 having its input connected to terminal 132, and an input connected to the output of an inverter 153 which has its input connected to a terminal 154 for receiving a delayed signal generated by the primary card lever PCL2, FIG. 8, and delayed by a delay device 252 of the type well known in the art.

Data transfer within core storage 66 takes place during the time interval starting at 285° of a machine cycle and ending at 330° of the same machine cycle. This data transfer period is initiated by an impulse provided by the sixteenth winding of the magnetic pulse generator 76. Since new cards are fed into position when data transfer is to take place within data storage, the clutches for controlling the primary and secondary feeds will be activated. For example, if the clutch for the primary feed is energized, a primary card is fed and the impulse for energizing the clutch is also utilized to control the inhibit drivers 109 for primary sequence storage. Since reading occurs at sync 2 time, all of the cores will be in the reset or erased state after sync 2 time and, with the inhibit drivers 109 turned on at sync 4 time, the entire storage content of primary sequence storage remains in the erased or zero state. Simultaneously, the primary register 89 is prevented from controlling the inhibit drivers 110 and the primary sequence register 87 is effectively substituted for the controlling source. Hence, the data which had been in primary sequence storage is transferred to primary storage.

The inhibit drivers are also controlled from the control panel 65. The primary suppress terminal 150 as well as the similar terminal for secondary suppress is available on the control panel 65 shown in detail in FIG. 16. Generally speaking, the primary suppress and secondary suppress terminals are connected by means of control panel wiring to other terminals of the control panel and primarily those which are activated by the comparing circuitry 161 which will be discussed later herein.

If the primary and secondary transfer suppress hubs or terminals are connected to the terminals of the compare circuitry 161, then the primary and secondary sequence registers 87 and 88 cannot control the primary and secondary inhibit drivers, and the primary and secondary registers 89 and 90 effect the regeneration of the data within primary and secondary storage through the control of the primary and secondary inhibit drivers. The primary and secondary suppression terminals have no control over primary sequence and secondary sequence inhibit drivers; and, therefore, these inhibit drivers are turned on to prevent regeneration of data and thereby maintain the entire primary sequence and secondary sequence core storage in the erased state. The primary and secondary suppress terminals can also be connected to any particular output of the position ring 98 so as to suppress transfer on a columnar basis. It is seen, in FIGS. 7 and 16, that the outputs from the position ring are brought to hubs 163 of the control panel 65 as well as to other internal terminals within the machine.

In case the stop signal is generated due to an error, it is desired that the contents of data storage 66 remain unchanged in order that the same may be displayed for individual check by the machine operator. Hence, when running out the primary and secondary cards in the machine during an error condition, the stop signal enables the gating of the inhibit drivers for primary and secondary sequence storage by the primary and secondary sequence registers 87 and 88 as well as the gating of the primary and secondary inhibit drivers by the primary and secondary registers 89 and 90. By this arrangement, normal transfer and erase functions are nullified to provide regeneration of the data during runout for an error stop condition.

When the machine has been reset after a stop condition, or during normal run-in operation, it is necessary to take two machine cycle before normal operation can resume. For example, the absence of a signal indicating that a primary card lever 2 is delayed; i.e., a PCL2D signal from the output of delay device 252 forces the transfer of data from primary sequence storage with each primary clutch cycle and overrides any primary suppress signal which may be wired at the control panel 65. Since the signal PCL2D represents the presence of three cards in the primary feed path, operation reverts to normal during the third machine cycle. With the completion of the second clutch cycle during run-in, the data within primary sequence storage, after the first clutch cycle, is transferred to primary storage. It may be noted that, to avoid regeneration of an error signal, the G1 bit of a character is not transferred to primary storage in numeric mode. This control is provided by logical AND circuit 143, FIG. 4, which is conditioned at bit 10 time to pass a signal within the numeric mode.

*Data checking, bit generation and mode control*

The outputs of the registers 87, 88, 89 and 90 are shown in FIG. 1 as being connected to data check and data generation circuits 160, the outputs therefrom being connected to the data transfer and regeneration controls 85 and to the comparing circuitry 161. The data check and data generation circuits 160, as well as the data transfer and regeneration controls 85, are under control of mode control circuitry 162. The mode control circuitry 162 is shown as being under control of the control panel 65. The mode control circuitry 162 provides for three modes of comparison and checking of data, the three modes include an alpha-numeric mode, a numeric mode with blanks equal to zero, and a numeric mode with blanks detected as errors. The mode control takes place on a columnar basis. The control panel 65, FIG. 7, has 28 plug hubs 163. The plug hubs 163 are successively impulsed by the position ring 98. Each output of the position ring 98 is connected to the inputs of two logical AND circuits; for example, position 1 of the position ring 98 is connected to the inputs of logical AND circuits 164 and 165. The output of logical AND circuit 164 is connected to plug hub 163 for column 1 and the output of logical AND circuit 165 is connected to the plug hub 163 for column 15. Logical AND circuit 164 also has an input connected to the output of a trigger 104 associated with the reset side thereof so as to be conditioned during columns 1–14. Logical AND circuit 165 has an input connected to the output of trigger 104 associated with the set side thereof so as to be conditioned during columns 15–28.

Similarly, the other positions of the position ring 98 are connected to logical AND circuits having their outputs connected to control panel plug hubs 163. The output of the fourteenth position of the position ring 98 is shown as being connected to inputs of logical AND circuits 166 and 167. The output of logical AND circuit 166 is connected to the control panel plug hub 163 for the fourteenth column while the output of logical AND circuit 167 is connected to the control panel plug hub 163 for the twenty-eighth column. Logical AND circuit 166 has an input connected to the output of trigger 104 associated with the reset side thereof and logical AND circuit 167 has an input connected to the output of trigger 104 associated with the set side thereof. Hence, plug hubs 163 for columns 1–28, inclusive, will be impulsed successively as the position ring advances. Since the position ring always starts with position one, the column 1 plug hub 163 must always be wired to initiate the mode control.

Figure 7:
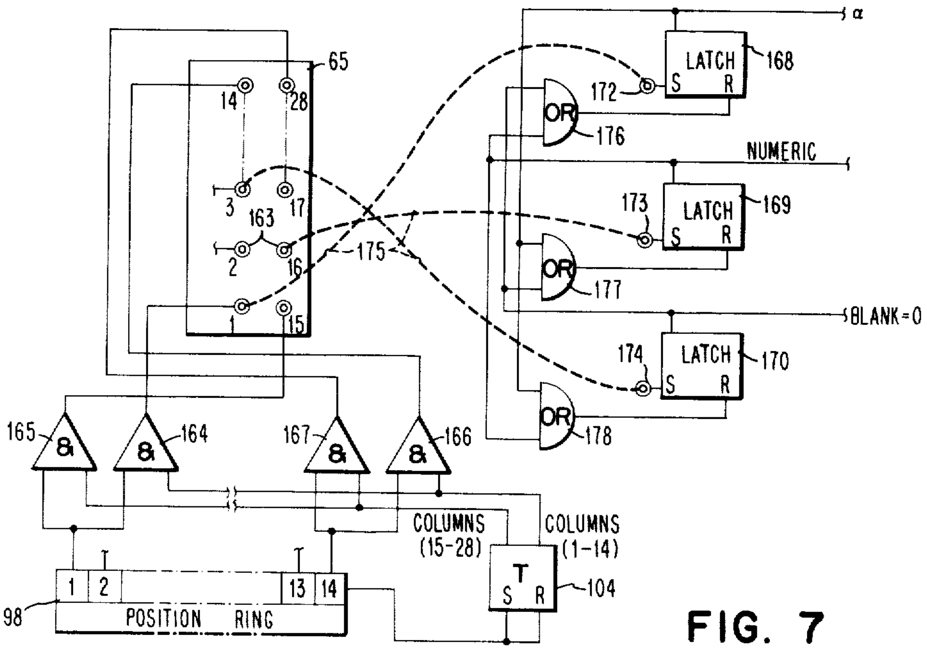
FIG. 7 is a schematic circuit diagram of the mode control circuitry.

Mode control is effected by a latch 168 for alphanumeric mode control, a latch 169 for numeric with blanks detected as errors mode control, and a latch 170 for numeric with blanks equal to zero mode control. Latches 168, 169 and 170 have their set terminals connected to control panel plug hubs 172, 173 and 174, respectively. The control panel plug hubs 172, 173 and 174 are selectively connectable to control panel plug hubs 163 by means of control panel plug wires 175. In FIG. 7, the control panel plug hub 172 is shown as being wired to the control panel plug hub 163 for column 1; hence, the machine will start in the alphanumeric mode. The operation continues in the alphanumeric mode until column 3. The control panel plug hub 174 is shown as being wired to the control panel plug hub 163 for column 3. Hence, the operation switches to numeric mode with blanks equal to zero starting at column 3. The operation then continues in the numeric mode with blanks equal to zero until column 16 because the control panel plug hub 173 is connected to the control panel plug hub 163 for column 16. Hence, the operation will switch from numeric mode with blanks equal to zero to the numeric mode with blanks detected as errors. The operation then continues through column 28 in the numeric mode with blanks detected as errors, and then switches back to the alphanumeric mode for column 1 for the next succeeding set of cards. The latches 168, 169 and 170 reset each other.

The reset terminals of latches 168, 169 and 170 are connected to the outputs of logical OR circuits 176, 177 and 178, respectively. Logical OR circuit 176 has an input connected to the output of latch 169 and an input connected to the output of latch 170. Logical OR circuit 177 has an input connected to the output of latch 168 and an input connected to the output of latch 170. Logical OR circuit 178 has an input connected to the output of latch 168 and an input connected to the output of latch 169. The outputs of latches 168, 169 and 170 provide the necessary control signals for alphanumeric mode operation, numeric mode with blanks detected equal to zero, respectively. Mode control for data transfer and regeneration has already been considered, the terminal 145 shown in FIG. 4 being connected to receive a signal from the alphanumeric control latch 168.

The data check and data generation circuits 160, shown in FIG. 1, essentially include primary sequence checking circuitry 181, FIG. 2*b*, connected to the output of register 87, primary checking circuitry 182 connected to the output of register 88, secondary checking circuitry 183 connected to the output of register 89 and secondary sequence checking circuitry 184 connected to the output of register 90. The output of register 87 is also connected to a data generator 185 and the output of register 90 is connected to a data generator 186, the data generators 185 and 186 being under control of the checking circuitry 181 and 184, respectively.

The outputs of registers 88 and 89, these registers being associated with the primary and secondary planes of data storage, are connected to check circuits 182 and 183; however, they are not connected to any generator circuits such as generator circuits 185 and 186 because generated data will be made available to the registers 88 and 89 from data storage 66 since the generated data generated by generators 185 and 186 is entered into the primary and secondary planes of data storage via the data transfer and regeneration circuitry 85.

The check circuitry 181 for primary sequence storage is identical to the check circuitry 184 for secondary sequence storage. Further, the data generator 185 is identical to the generator 186. Additionally, the primary check circuitry 182 is identical to secondary check circuitry 183 and is quite similar to the primary sequence check circuitry 181. Accordingly, the details of the primary sequence check circuitry 181 and the data generator 185 will be shown together with the details of primary check circuitry 182 which are different from that of check circuitry 181. Those portions of the check circuitry 182 which are identical to that of 181 will not be shown; however, they will be described.

Essentially, the data in all areas of data storage 66; i.e., primary sequence storage, primary storage, secondary sequence storage and secondary storage is checked for validity after the data has been transferred from data storage 66 to the registers 87, 88, 89 and 90. The validity check or code check is accomplished by counting the number of bits of data forming each character. Every valid numeric character 1–9 must comprise two bits of the bits E through A. Hence, a 2-out-of-5 check is made for the bits E through A. Every valid alphabetic character A–Z will comprise two bits of the bits E through A and one bit of the bits 0, 11 and 12. Accordingly, for alphabetic characters, a check of two out of five for the bits E through A and a check for one out of three for the bits 0, 11 and 12 will be made. A valid numeric zero is represented by one bit of the bits 0, 11 and 12. Hence, a 1-out-of-3 check will be made for this particular character. The character 0/1 is represented by two bits of the bits E through A, one bit of the bit 0, 11 and 12 and by one of the generated bits G1 and G2. The characters 11 and 12 are represented by one bit of the bits 0, 11 and 12 and by one of the generated bits G1 and G2. A valid blank character is represented by a presence of both the generated bits G1 and G2.

The validity or code check can be suppressed for any particular character and can be made under three different modes of operation; i.e., the alphabetic mode, the numeric mode where blanks are equal to zero, and the numeric mode where blanks are invalid. Hence, when operating in the numeric mode for both conditions; i.e., blanks equal to zero and blanks being invalid, the presence of a 0, 11 or 12 bit is valid only for the numeric zero. All other numeric characters require two bits of the bits E through A. More than two bits of the bits E through A would represent an invalid condition for both alphanumeric and numeric modes. Likewise, except for numeric zero, a single bit of the bits 0, 11 and 12 is invalid for numeric characters, and more than one bit of the bits 0, 11 or 12 is invalid for alphabetic characters.

With this as background, the check circuitry 181 and data generator 185, shown in FIG. 5, together with a portion of the check circuitry 182, will be described. It should be recalled that data is read out from data storage during sync 2 time to the registers 87, 88, 89 and 90. The check circuitry 181, as well as the check circuitry 182, includes a first bit latch 190, a second bit latch 191, a third bit latch 192, a 5-bit latch 193, a 1-bit latch 194 and a G2 generated bit latch 195.

The latches 190, 191 and 192, 193, 194, 195 have their reset terminals commonly connected to the output of a logical AND circuit 200 having one input connected to the output of the first position of the sync ring 93 and another input connected to the output of the first position of the bit ring 94. Hence, the latches are reset by the sync 1 pulse during the first bit interval of a character. At sync 2 time of each bit interval of a character, data is read out from storage to the associated registers 87, 88, 89 and 90. The primary sequence register 87 is shown in FIG. 5 with its output connected to inputs of logical AND circuits 201, 202 and 203. The output of the primary sequence register 87 is also connected to the input of logical OR circuit 204 which already had been mentioned in connection with the inhibit control of FIG. 4. Logical AND circuit 201, FIG. 5, has another input connected to the output of the fourth position of the sync ring. The output of logical AND circuit 201 is connected to an input of a logical OR circuit 205 having its output connected to the set terminal of the first bit latch 190. Hence, logical AND circuit 201 is one of the controls for operating the first bit latch 190. The first bit of data read out of data storage to primary sequence register 87 during sync 2 time sets the first bit latch 190 at sync 4 time.

While logical AND circuit 203 has its output connected to the set terminal of the third bit latch 192 and has an input connected to the output of the second position of the sync ring and an input connected to the output of the second bit latch 191 associated with the set side thereof, the third bit latch 192 will not be set during sync 2 time, even though a bit of data is read into the primary sequence register 87 at sync 2 time, because the second bit latch 191 will not be set by sync 2 time. As it will be seen shortly, the setting of the third bit latch 192 under any conditions, represents an error condition. Logical AND circuit 202 has an input connected to the output of the first bit latch 190 associated with the set side thereof and an input connected to the output of the third position of the sync ring. The output of logical AND circuit 202 is connected to the set terminal of the second bit latch 191. Since the first bit latch cannot be set until sync 4 time of the first bit interval, it is obvious that the second bit latch 191 will not be set during the first bit interval. However, with the first bit latch 190 set, the second bit latch 191 will be set during sync 3 time of the interval for the next bit of data transferred from data storage.

When in the numeric mode, latches 190, 191, and 192 are not reset until sync 1 time of the first bit interval. They are also reset at this time within the alphanumeric mode. However, when in the alphanumeric mode, the latches 190, 191 and 192 are also reset during sync 1 time of the sixth bit interval. A logical AND circuit 206 has an input connected to the output of the alphanumeric mode latch 168, an input connected to the output of the first portion of the sync ring 93 and an input connected to the output of the sixth position of the bit ring 94. The output of logical AND circuit 206 is connected to the input of a logical OR circuit 208, the same also having an input connected to the output of logical AND circuit 200. The output of logical OR circuit 208 is connected to the reset terminals of latches 190, 191 and 192. Hence, while latches 193, 194 and 195 can only be reset during sync 1 time of the first bit interval, latches 190, 191 and 192 can be reset during sync 1 time of the first bit interval and during sync 1 time of the sixth bit interval, when in the alphanumeric mode.

The first bit latch 190, in addition to providing a check as to whether or not a bit of data had been entered into the primary sequence register 87, also functions to generate a G2 bit. The output of the first bit latch 190 associated with the set side thereof is also connected to an input of a logical AND circuit 210. Logical AND circuit 210 also has an input connected to the output of a latch 193 which is associated with the set side thereof, an input connected to the output of a latch 194 associated with the set side thereof, and an input connected to the output of the sixth position of the bit ring. The output of logical AND circuit 210 is connected as an input to a logical OR circuit 211 having its output connected to the set terminal of a latch 195 for generating the bit G2.

The output of the latch 195 associated with the set side thereof is connected to an input of a logical AND circuit 212 also having an input connected to the output of the ninth position of the bit ring. Hence, if the first bit latch 190 is set and the latches 193 and 194 are also set during the sixth bit interval, then the latch 195 will be set and, at the ninth bit interval, a bit G2 will be generated or passed to logical OR circuit 204. Logical OR circuit 204 has its output connected to the data transfer and regeneration circuitry 85 which was described previously herein.

The setting of the latch 195 for generating the bit G2 is also accomplished under control of a logical AND circuit 215 which has its output connected to the input of logical OR circuit 211. Logical AND circuit 215 has an input connected to the output of the first bit latch 190 associated with the off side thereof, an input connected to the output of the latch 193 associated with the off or reset side thereof and an input connected to the output of the seventh position of the bit ring 94. Hence, if the first bit latch 190 is off and the latch 193 is off, during the seventh bit interval of a character, then the latch 195 will be set and a G2 bit will be generated during the ninth bit interval of that character interval under control of the logical AND circuit 212. By this arrangement, a G2 bit is provided by logical AND circuit 210 for the characters 0/1, 11 and 12 and a G2 bit is provided by logical AND circuits 215 and 212 for a valid blank character. It should be noted that, since the output of the primary sequence register 87 is also connected to an input of logical OR circuit 204, a bit present in the primary sequence register 87 will be made available to the data transfer and regeneration circuitry 85.

The generation of a G1 bit is under control of a logical AND circuit 216 having its output connected to an input of logical OR circuit 204 and having an input connected to the output of the first bit latch associated with the off or reset side thereof, an input connected to the output of the latch 193 associated with the off side thereof and an input connected to the output of the tenth position of the bit ring 94. Hence, if the first bit latch 190 is not set and the latch 193 is not set, then at the tenth bit interval a G1 bit will be generated and passed to the transfer and regeneration circuitry 85 via the logical OR circuit 204 under control of logical AND circuit 216.

The setting of latches 193 and 194 is under control of logical AND circuits 217 and 218, respectively. Logical AND circuit 217 has its output connected to the set terminal of latch 193 and has an input connected to the output of the second bit latch 191 associated with the set side thereof and an input connected to the output of the fifth position of the bit ring 94. By this arrangement, the latch 193 will be set if two bits have been read from data storage into the primary sequence register 87 during the first five bit intervals. Of course, if the latch 193 is set, the G1 bit will not be generated and a G2 bit will be generated only for the 0/1 condition.

The output of logical AND circuit 218 is connected to the set terminal of latch 194 and has an input connected to the output of the first bit latch 190 associated with the off side thereof and an input connected to the output of the fourth position of the bit ring. Therefore the latch 194 is set during the fourth bit interval and this is prior to the setting of the first bit latch 190. The first bit latch 190 for the character 0/1 cannot be set until sync 4 time of the fourth bit interval; hence, the first bit latch 190 will be off, thereby conditioning logical AND circuit 218 to enable an impulse to be passed thereby at 4-bit time during the first three sync times of the fourth bit interval to enable the setting of the latch 194. The first bit latch 190 is then set during the fourth bit interval at sync 4 time; however, the latch 194 remains set because it is not reset until sync 1 time of the first bit interval which would follow.

Further, the second bit latch 191 is set during sync 3 time of the fifth bit interval because, for a 0/1 character, there will be a bit in the primary sequence register 87 for the fifth bit interval. Accordingly, because the second bit latch 191 is set, logical AND circuit 217 will be conditioned during the fifth bit interval, namely, during 4 sync time for passing an impulse to set the latch 193. The first bit latch 190 and second bit latch 191 are then reset at sync 1 time of the sixth bit interval; however, the latches 193 and 194 remain in the set condition. The first bit latch 190 is then set at sync 4 time during the sixth bit interval because, for the character 0/1, there will be a bit in the primary sequence register 87 during the sixth bit interval. Hence, all of the conditions of the logical AND circuit 210 will be satisfied and an impulse will be passed thereby via logical OR circuit 211 to set latch 195 to facilitate the generation of a G2 bit at 9-bit time through the facility of logical AND circuit 212.

The first bit latch 190 can also be set, when in the numeric mode with blanks equal to zero, under the control of a logical AND circuit 220. Logical AND circuit 220 has its output connected to an input of logical OR circuit 205 and has an input connected to the output of the second bit latch 191 associated with the off side thereof, an input connected to the numeric mode blanks equal to zero latch 170 and an input connected to the output of the sixth position of the bit ring 94. Hence, when in the numeric mode for blanks equal to zero, then at 6-bit time, the condition of the second bit latch 191 is sampled and, if it is off, this is an indication that the numeric character is blank; and, since we want this condition to be valid, then the first bit latch 190 must be set at 6-bit time because a zero represents a bit present during the 6-bit interval (see Character Code Chart of FIG. 12).

The check circuitry 182 is identical to the check circuitry 181 except that it does not include latches 194 and 195 and the associated logical AND circuits for these latches because primary storage has the facility for storing the generated bits G1 and G2 generated by generator 185. Consequently, there is no need for generating these bits since they already exist. The check circuitry 182 does include a latch comparable to the latch 193 of the check circuitry 181, this latch being also utilized for error detection purposes, as will be described shortly.

Figure 5:
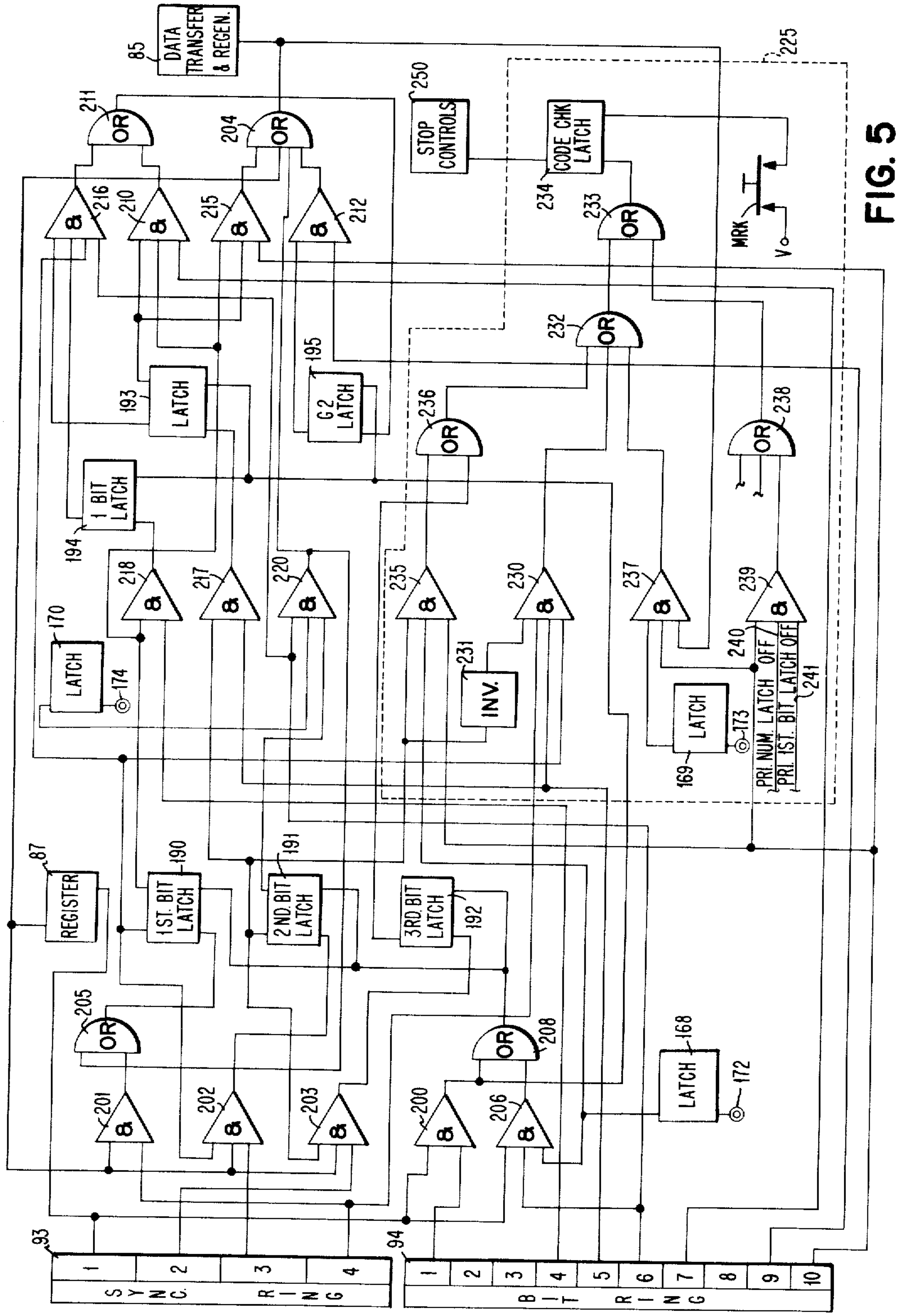
FIG. 5 is a schematic circuit diagram of the data check, data generation and error detection circuitry.

The outputs from the check circuits 181, 182, 183, and 184, FIG. 2*b*, are connected to error detection circuitry 225, FIGS. 2*b* and 5. Generally speaking, the error detection circuitry 225 looks at the conditions of the check circuitry. During the fifth bit interval, the first bit latch 190 and the second bit latch 191 are sampled for the presence of two bits for the particular character. If only one bit exists; i.e., if only the first bit latch 190 has been set, then an error condition exists. An error condition will be detected by the error circuitry 225, as will be described shortly. If the third bit latch 192 is set either during the first five bit intervals or during the next five bit intervals, then an error condition exists. When operating in the alphanumeric mode, if the second bit latch 191 is in the set state at 10-bit time, an error condition exists because, when in the alphanumeric mode of operation, the second bit latch 191 is reset at 6-bit time and thereafter only one bit should be present for a valid character. Hence, the second bit latch 191 should not be set for a second time.

When operating in the numeric mode with blanks detected as errors, the absence of bits for any character will generate an error condition. When operating in the numeric mode with blanks equal to zero, then, upon detection of no bits during the first five bit intervals, a bit is generated or forced during the sixth bit interval to represent a zero (see the Code Chart of FIG. 12 for representation of zero) and the presence of a bit during the sixth bit interval sets the first bit latch 190, thereby preventing the generation of an error signal. With the foregoing as general background information, the particular error detection circuitry 225 shown in FIG. 5 will now be described. Additionally, that portion of the error detection circuitry relating to data coming from the primary core storage which is different from that for data coming from primary sequence storage is also shown.

The output of the first bit latch 190 associated with the set side thereof is connected as an input to a logical AND circuit 230. Logical AND circuit 230 also has an input connected to the output of an inverter 231 which has its input connected to the output of the second bit latch 191 which is associated with the set side thereof, an input connected to the output of the fifth position of the bit ring 94 and an input connected to the output of the fourth position of the sync ring 93. The output of the logical AND circuit 230 is connected to an input of the logical OR circuit 232. The output of logical OR 232 is connected as an input to a logical OR circuit 233 having its output connected to the set terminal of a code check latch 234. Hence, logical AND circuit 230 develops an error signal to set the code latch 234 if the second bit latch 191 is not set or on by sync 4 time of the fifth bit interval.

A logical AND circuit 235 has an input connected to the output of the second bit latch 191 associated with the set side thereof, an input connected to the output of the alpha mode latch 168, and an input connected to the output of the tenth position of the bit ring 94. The output of logical AND circuit 235 is connected to an input of a logical OR circuit 236 having its output connected to an input of logical OR circuit 232. By this arrangement, logical AND circuit 235 looks to see if the second bit latch 191 is on or in the set state at 10-bit time when in the alphanumeric mode of operation. If the second bit latch 191 is on under the conditions just mentioned, then an error signal will be passed by logical AND circuit 235 via logical OR circuits 236, 232 and 233 to set the code check latch 234. Logical OR circuit 236 also has an input connected to the output of the third bit latch 192 associated with the set side thereof. The output of the third bit latch 192 is directly connected to the logical OR circuit 236 because any setting of the third bit latch 192 represents an error condition.

A logical AND circuit 237 functions to detect the absence of any bits for a character when operating in the numeric mode with blanks equal to zero. Logical AND circuit 237 has an input connected to the output of the numeric mode latch with blanks detected as errors 169, an input connected to the output of the tenth position of the bit ring 94, and an input connected to the output of logical OR circuit 204.

Logical OR circuit 238 is similar to logical OR circuit 232 and has inputs connected to the error detection circuitry associated with the primary checking circuitry 182. This error detection circuitry is identical to that associated with the primary sequence checking circuitry 181 except for one condition, i.e., the circuitry for detecting blanks is different because generated bits are stored in primary storage. A logical AND circuit 239 of the primary error detection circuitry looks to see if the primary numeric latch and the primary first bit latch, both not shown for the primary checking circuitry, are off at 10-bit time. Accordingly, logical AND circuit 239 has an input connected to the output of the tenth position of the big ring, an input connected to the conductor 240 which leads to the output associated with the off side of the primary numeric latch and an input connected to a conductor 241 which is connected to the output associated with the off side of the primary first bit latch. The output of logical AND circuit 239 is connected to one of the inputs of logical OR circuit 238 which has its output connected to logical OR circuit 233. Hence, the other inputs to logical OR circuit 238 are similar to the inputs to logical OR circuit 232, but are for the primary checking circuitry.

The output of the code check latch 234 associated with the set side thereof is connected to stop control circuits 250. However, before describing the details of the stop control circuits, because the stop control circuits 250 are under control of circuits other than the error detection circuits 225, the data comparing circuitry 161 will now be described.

*Data comparing and oscillator control*

Figure 8:
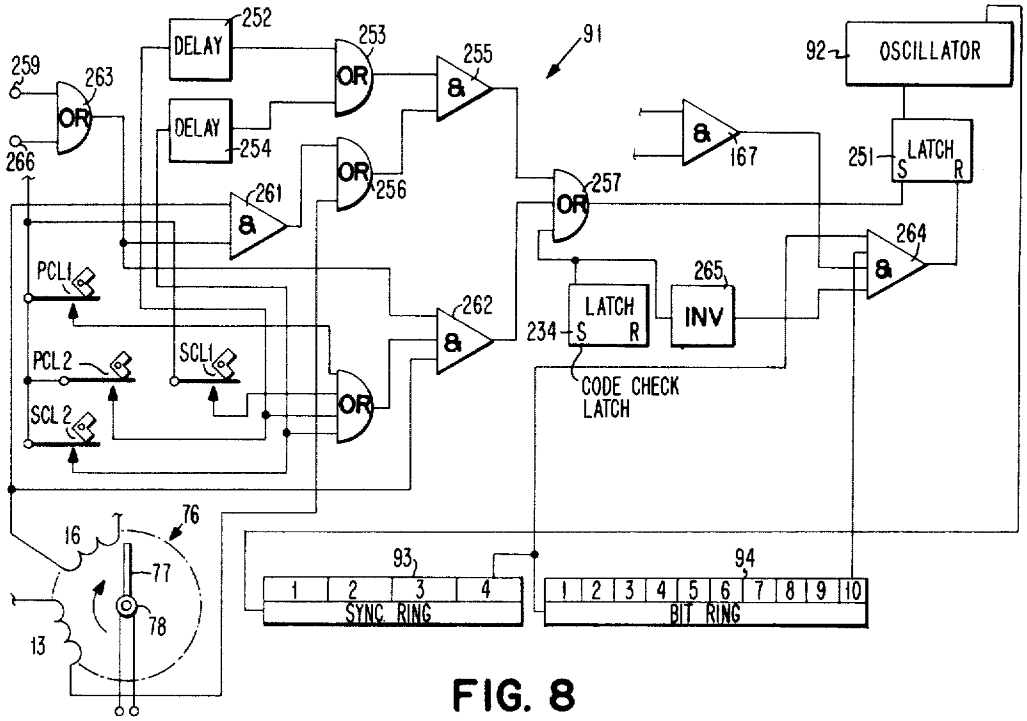
FIG. 8 is a schematic circuit diagram of the oscillator control circuitry.

The data comparing circuitry 161 essentially consists of circuitry for checking data obtained from primary cards to see whether or not the primary cards are in a particular sequence, circuitry for checking data emanating from the secondary cards to see whether the secondary cards are in a particular sequence, and cross-compare circuitry for determining whether or not a predetermined relationship exists between data derived from primary cards with data derived from secondary cards. The data compare circuitry 161 essentially looks at the data read out from data storage 66 to registers 87, 88, 89 and 90 during the data compare and answer sampling period which starts at approximately 222° of a machine cycle and terminates at approximately 270° of that same machine cycle. This period is determined by the oscillator control 91 which enables the oscillator clock 92 to be operative during this period. The details of the oscillator control 91 are shown in FIG. 8.

Essentially, the oscillator control circuitry 91 controls the oscillator 92 so that the oscillator 92 will be operative to provide driving electrical impulses to the sync ring 93 at only predetermined time intervals in the machine cycle. The input of the oscillator 92 is connected to the output of a control latch 251 of the oscillator control circuitry 91. Hence, the turning on and turning off of the oscillator 92 is under control of the latch 251. When no error conditions exist, this condition being provided by the code check latch 234, the oscillator 92 is turned on at 222° and remains on until approximately 270° of the same machine cycle. The oscillator 92 is turned on again at 285° of that same machine cycle and remains on until approximately 333° of that machine cycle. At 222° of a machine cycle, data comparing operation starts provided a record card is in either the final position of the primary or secondary feed paths; i.e., just prior to entry, the feed rollers for conveying the record cards into the card-stacking receptacles 14.

Essentially, this signal is provided by delaying either the signal provided by the primary card lever PCL2 or by the secondary card lever SCL2. The contacts operated by the primary card lever PCL2 are connected to a delay device 252 which has its output connected to the input of a logical OR circuit 253. Similarly, the contacts operated by the secondary card lever SCL2 are connected to the input of a delay device 254 which has its output connected to an input of the logical OR circuit 253. The output of the logical OR circuit 253 is connected to an input of the logical AND circuit 255. Logical AND circuit 255 also has an input connected to the output of a logical OR circuit 256. Logical OR circuit 256 has an input connected to the output of the thirteenth coil winding of the magnetic pulse generator 76. The thirteenth winding of the magnetic pulse generator 76 emits an impulse at approximately 222° of a machine cycle. Hence, the conditions of logical AND circuit 255 will be satisfied if cards are either in the primary or secondary feed and under or just past the second card lever in those feeds at 222° of a machine cycle.

The output of logical AND circuit 255 is connected to an input of a logical OR circuit 257 which has its output connected to the set terminal of the control latch 251. It is thus seen that the control latch 251 will be set at 222° of a machine cycle to render the oscillator 92 operative under the conditions just mentioned. The conditions of logical AND circuit 255 may be also satisfied if either the primary or secondary clutch is operated at 285° of a machine cycle. A logical OR circuit 258 has an input connected to a terminal 259 for receiving the impulse which energizes the primary clutch and has an input connected to a terminal 260 for receiving the impulse which energizes the secondary clutch. The output of the logical OR circuit 258 is connected to an input of a logical AND circuit 261 which has its output connected to an input of logical OR circuit 256. Logical AND circuit 261 also has an input connected to the sixteenth winding of the magnetic pulse generator 76. Hence, if either the primary or secondary clutch is operated at 285° of a machine cycle, the conditions of logical AND circuit 261 are met; and, therefore, an impulse is passed via the logical OR circuit 256 to condition the logical AND circuit 255 which will pass an impulse via logical OR circuit 257 to set the latch 251, if there are cards either in the primary or secondary card paths and under the second card levers in those paths.

Logical OR circuit 257 also has an input connected to the output of a logical AND circuit 262 and an input connected to the output of the code check latch 234. Logical AND circuit 262 has an input connected to the output of a logical OR circuit 258, an input connected to the output of the sixteenth winding of the magnetic pulse generator 76, and an input connected to the output of a logical OR circuit 263. Logical OR circuit 263 has inputs connected to the contacts operated by the primary card lever PCL1, the secondary card lever SCL1, the primary card lever PCL2 and the secondary card lever SCL2. Hence, it is seen that the control latch 251 will be set at approximately 285° of a machine cycle if any of the card lever contacts are operated and either the primary or secondary clutch is operated at 285° of a machine cycle. It will be recalled that the period for transferring information relative to data storage 66 starts at approximately 285° of a machine cycle.

The control latch 251 is turned off or reset and thereby turns off the oscillator 92 under control of a logical AND circuit 264. Th turning off of the oscillator 92 by resetting the control latch 251 essentially occurs whenever the timing rings; i.e., the sync ring 93, the bit ring 94 and the position ring 98, have completed the addressing of all the positions in core storage 66. This is accomplished by sampling the appropriate outputs of these particular rings. The condition for turning off the oscillator 92 is that an error condition must not exist and this may be accomplished by checking the condition of the code check latch 234. Accordingly, the inputs of logical AND circuit 264 are connected to the output of the fourth position of the sync ring 93, the output of the tenth position of the bit ring 94 to the output of logical AND circuit 167, FIG. 7, which indicates the twenty-eighth position or column in storage, and to the output of an inverter 265, FIG. 8, having its input connected to the output of the code check latch 234. The reason for checking the condition of the code check latch 234 at this particular time is that, if an error exists, the oscillator is held on so that the display lights of the machine, not shown, will be turned on for the column or position in which the error occurred.

The primary sequence compare circuitry, the secondary sequence compare circuitry and the cross-comparison circuitry are identical. Accordingly, only the primary sequence compare circuitry is shown and described in detail in FIG. 9. The data comparing circuits function to inspect the conditions of the registers 87, 88, 89 and 90 to determine whether the conditions thereof, i.e., whether or not the same contain bits of data, are high, low or equal with respect to each other. The character of the collating code shown in FIG. 12 is such that the comparing operation may be performed serial by bit, serial by character and parallel by core plane.

The data comparing operations proceed starting at the high order of a field or at the left-most position of a field and progressing to the right starting with the E bit for each position and progressing toward the G1 bit. When two data characters are being compared, the identical bit positions for these charatcers are looked at simultaneously and the bit position containing a bit is arbitrarily stated to be low compared to the position which does not contain a bit. The code chosen is such that the last unequal comparison defines the relative magnitude of the characters being compared.

Referring to FIG. 12, the collating sequence by character is from low order to high order starting with the character termed "blank" and proceeding toward numeric "9." Comparing within a character proceeds from high order to low order starting with the E bit and proceeding toward the G1 bit. According to these rules then, a "6" should be higher than a "5." To find out whether this is true, refer to FIG. 12. It is seen that for the E bit position there are no bits for either a "5" or a "6"; hence, the comparison would be equal. Progressing to the D bit position, it is seen that there is a bit for the character "6" but not for the character "5"; hence, at this point in the data comparing operation, the character "6" compares low with respect to character "5." However, upon advancing to the C bit position, it is seen that the character "5" contains a bit while the character "6" does not. Consequently, the character "5" now compares low with respect to character "6." Advancing to the B bit position, it is seen that both character "5" and "6" contain a bit and, therefore, they compare equal. However, this equal condition does not change the answer last received; i.e., the character "5" was low with respect to character "6." Since the remaining bit positions for both the characters "5" and "6" do not contain any bits, these positions will compare equal and, accordingly, the last unequal condition will prevail; that is, the character "5" compares low with respect to character "6."

There are three answer latches; i.e., high, low and equal answer latches, for the primary sequence comparing circuitry, for the secondary sequence comparing circuitry, and for the cross-comparing circuitry. These latches provide storage for the answers which will be high, low or equal. These latches are interconnected so that a high answer will override an earlier low answer and vice versa; however, the equal answer provided by the equal latch is held in the reset state, at any time that a high or low answer exists and it does not have the facility of overriding the high or low answer latches. By this arrangement, as the bits are being compared bit position by bit position in the particular sequence mentioned, the last unequal comparison, whether it be high or low, will determine the answer for the particular sequence of comparisons for the particular character position. The equal answer latch will be set at the end of a comparing operation only if all the bits for every bit position compared equal.

Assume the following two numbers are being compared:

98675
98595

The position ring 98 essentially starts the comparison operation beginning with the left-most column of the numbers and causing the comparison to proceed to the right. The bit ring 94 causes the comparison to proceed bit position by bit position with the bit positions being interrogated during every sync 2 time of a bit position under control of the sync ring 93. It is seen that, for the first column positions of the numbers being compared for the example given, the answer latches will show an equal comparison. The comparison then continues to the next column without altering the answer latches. Again, an equal answer will prevail at the end of the comparison for the second character position and the comparison operation continues for the third character position or column. At the end of the comparison operation for the third column, the answer latches will indicate that the first number is high compared with the second number and the equal answer latch will have been turned off. The equal answer latch determines whether or not the comparing operation will continue and, with the equal answer latch being off, the comparing operation stops. The equal answer latch is looked at after all ten bits of the character have been compared. However, even though the comparing operation stops, the reading out and writing into core storage 66 continues through the remainder of the twenty-eight columns or storage positions.

All of the answer latches are reset at approximately 66° of a machine cycle under control of signals from the control panel 65. With this as background, the details of the primary sequence comparing circuitry, shown in FIG. 9, will now be described.

Figure 9:
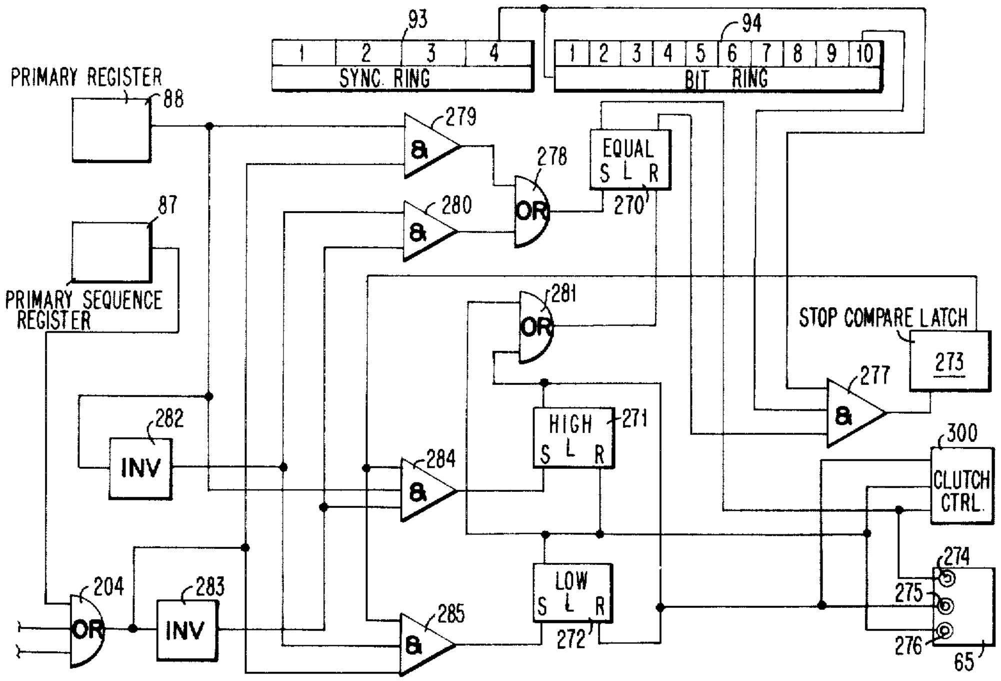
FIG. 9 is a schematic circuit diagram of the data compare and answer circuitry.

The primary sequence comparing circuitry includes an equal compare latch 270, FIG. 9, a high compare latch 271, a low compare latch 272 and a stop compare latch 273. The output of the equal compare latch 270 associated with the set side thereof is connected to a hub 274 located upon the control panel 65, as seen in FIG. 16. The output of the high compare latch 271, FIG. 9, associated with the set side thereof is connected to a plug hub 275 also located on the control panel 66. Similarly, the output of the low compare latch 272 associated with the set side thereof is connected to a plug hub 276 located on the control panel 65.

The stop compare latch 273 is set under control of a logical AND circuit 277 having an input connected to the output of the equal compare latch 270 associated with the reset side thereof, an input connected to the output of the tenth position of the bit ring 94, and an input connected to the output of the fourth position of the sync ring 93. The set terminal of the equal compare latch 270 is connected to the output of a logical OR circuit 278 having its inputs connected to the output of a logical AND circuit 279 and to the output of a logical AND circuit 280, respectively. Hence, logical AND circuits 279 and 280 effectively control the setting of the equal compare latch 270. The resetting of the equal compare latch is under control of a logical OR circuit 281 having its output connected to the reset terminal of the equal compare latch 270. The logical OR circuit 281 has an input connected to the output of the high compare latch 271 associated with the set side thereof and an input connected to the output of the low compare latch 272 associated with the set side thereof. It is thus seen that either the high compare latch 271 or the low compare latch 272 is capable of resetting the equal compare latch 270.

Logical AND circuit 279 has an input connected to the output of the primary register 88 and an input connected to the output of logical OR circuit 204, also shown in FIG. 5, which has, as it will be recalled, in addition to other inputs, an input from the primary sequence register 87. Hence, logical AND circuit 279 functions to compare the contents of the primary sequence register 87 with that of the primary register 88; and, if both of these registers contain a bit of information, logical AND circuit 279 will pass a signal via logical OR circuit 278 to set the equal compare latch 270.

Logical AND circuit 280 has an input connected to the output of an inverter 282 and an input connected to the output of an inverter 283. The input of the inverter 282 is connected to the primary register 88 while the input to the inverter 283 is connected to the output of the logical OR circuit 204. Consequently, logical AND circuit 280 functions to compare the primary sequence register 87 with the primary register 88; and, if no bits of data are simultaneously present in these registers, then logical AND circuit 280 passes an impulse via logical OR circuit 278 to set the equal compare latch 270.

The high compare latch 271 is set under the control of a logical AND circuit 284 having its output connected to the set terminal of the high compare latch 271. The reset terminal of the high compare latch is connected to the output of the low compare latch 272 associated with the set side thereof. Hence, the setting of the low compare latch causes the high compare latch to reset as well as the equal compare latch 270 to reset. Logical AND circuit 284 has an input connected to the output of the primary register 88, an input connected to the output of inverter 283 and an input connected to the output of the stop compare latch 273 associated with the reset side thereof. Hence, with a bit of data in the primary register 88 simultaneously with the absence of a bit of data in the primary sequence register 87 and with the stop compare latch 273 reset or in the off state, logical AND circuit 284 will pass an electrical impulse to set the high compare latch 271, indicating that the primary sequence register 87 compares high to that of the primary register 88.

The low compare latch 272 is set under control of a logical AND circuit 285 which has its output connected to the set terminal of the low compare latch 272. The reset terminal of the low compare latch 272 is connected to the output of the high compare latch 271 associated with the set side thereof. Hence, the low compare latch 272 is reset by the high compare latch 271, the high compare latch 271 also being capable of resetting the equal compare latch 270. Logical AND circuit 285 has an input connected to the output of logical OR circuit 204, an input connected to the output of the inverter 282 and an input connected to the output of the stop compare latch 273, which is associated with the reset side thereof. By this arrangement, the logical AND circuit 285 functions to determine if there is a bit in the primary sequence register 87 and not a bit in the primary register 83. If these conditions prevail and the stop compare latch 273 is in the off state, then logical AND circuit 285 will pass an impulse to set the low compare latch 272. Hence, the presence of a bit in the primary sequence register and the absence of a bit in the primary register indicates that the primary sequence register is low compared to the primary register.

The sensing of the equal compare latch 270 after all ten bit positions of a character have been compared is under control of the logical AND circuit 277. The output of the logical AND circuit 277 is connected to the set terminal of the stop compare latch 273. Hence, as it will be seen shortly, if the equal compare latch 270 is not set or on after all ten bit positions of a character have been compared, then the comparison operation for succeeding characters terminates because the stop compare latch 273 will be set.

The logical AND circuit 277 has an input connected to the output of the equal compare latch 270 associated with the off or reset side thereof, an input connected to the output of the fourth position of the sync ring 93 and an input connected to the output of the tenth position of the bit ring 94. Of course, if the equal compare latch 270 is set or on at sync 4 time of bit 10 time, then the comparing operation continues.

*Clutch and card pocket control*

The outputs of the answer latches 270, 271 and 272 of the compare circuit 161, in addition to being connected to plug hubs 274, 275 and 276 on the control panel 65, are connected to the clutch control circuitry 300, FIGS. 1, 2*a* and 9. The details of the clutch control circuitry 300 are shown in FIGS. 10*a* and 10*b*. Primary clutch 301, schematically illustrated in FIG. 10*a*, is a single revolution dog-type clutch selectively operable under the control of a control magnet, not shown, which is energized by means of a magnet driver 302. Primary eject clutch 303 is also a single revolution dog-type clutch operably controlled by a magnet, not shown, which is selectively energized under control of a magnet driver 304. Secondary clutch 305, likewise, is a single revolution dog-type clutch which is operably controlled by a magnet, not shown, which is selectively energized by means of a magnet driver 306. The primary, primary eject and secondary clutches are substantially identical and are of the type shown and described in U.S. Patent No. 2,985,271 to L. A. Wilson, dated May 23, 1961.

The primary clutch 301, the primary eject clutch 303 and the secondary clutch 305 are controlled by the answer latches 270, 271 and 272 of the comparing circuitry 161, by the control panel 65, by automatic run-in and runout circuitry, and by runout circuitry under error conditions. The clutch action for performing a basic merge or match operation is completely automatic. The answers of the compare circuitry 161 determine the clutching requirements for the subsequent feed cycle and may be summarized in the following table:

| | Answers | | | Merge | | | Match | | |
|---|---|---|---|---|---|---|---|---|---|
| | Cr. Comp. | Pri. Seq. | Sec. Seq. | Pri. | Ej. | Sec. | Pri. | Ej. | Sec. |
| 1 | Equal | Equal | Equal | X | X | ----- | X | X | X |
| 2 | Equal | High | Equal | ----- | X | X | ----- | X | X |
| 3 | Equal | Equal | High | X | X | ----- | X | X | ----- |
| 4 | Equal | High | High | X | X | X | X | X | X |
| 5 | Low Pri. | Equal or High. | Equal or High. | X | X | ----- | X | X | ----- |
| 6 | Low Sec. | Equal or High. | Equal or High. | ----- | ----- | X | ----- | ----- | X |

The circuits for controlling the primary clutch 301, the primary eject clutch 303 and the secondary clutch 305 are conditioned by a signal designated "All Cycles." The timing for the "All Cycles" signal is accomplished by means of a latch 310, FIG. 10*a*, having its set terminal connected to the output of the fifteenth coil of the magnetic impulse generator 76 and its reset terminal is connected to the output of the seventeenth coil of the magnetic pulse generator 76. Hence, the latch 310 is set at approximately 270° of a machine cycle and reset to approximately 339° of the same machine cycle. The output of the latch 310 associated with the set side thereof is connected to inputs of logical AND circuits 311 and 312. The output of the logical AND circuit 311 is connected to the input of a current driver or amplifier 313, the output of which provides the "All Cycles" signal. The output of the driver 313 is connected to a plug hub 314 located on the control panel 65 which is designated "All Cycles" control hub. It is thus seen that the logical AND circuit 311 controls the development of the "All Cycles" signal. The logical AND circuit 311 also has an input connected to the output of an inverter 315 which has its input connected to a terminal 316 for receiving stop signals, an input connected to the output of a logical OR circuit 317, and an input connected to a terminal 318 for receiving a run signal.

If the conditions of logical AND circuit 312 are met, logical AND circuit 312 passes a signal designated "Error All Cycles." Logical AND circuit 312 has an input connected to the output of logical OR circuit 317 and an input connected to the terminal 318 for receiving a run signal in addition to the input connected to the output of the latch 310. The "Error All Cycles" signal enables runout of cards from the machine under stop conditions.

Logical OR circuit 317 has an input connected to the output of a logical AND circuit 319, an input connected to the output of a logical AND circuit 320, an input connected to the output of a logical AND circuit 321 and an input connected to a manually operated runout switch 326. Logical AND circuit 319 has an input connected to the contacts operated by the secondary hopper contact lever SHCL and an input connected to the contact operated by the primary hopper contact lever PHCL. Logical AND circuit 320 has an input connected to the output of an inverter 322 which has its input connected to the contact operated by the secondary card lever SCL1, an input connected to the output of an inverter 323 having its input connected to the contact operated by the secondary hopper contact lever SHCL and an input connected to the contact operated by the primary hopper contact lever PHCL. Logical AND circuit 321 has an input connected to the output of an inverter 324 which has its input connected to the contact operated by the primary card lever PCL1, an input connected to the output of an inverter 325 having its input connected to the contact operated by the primary hopper contact lever PHCL, and an input connected to the contact operated by the secondary hopper contact lever SHCL. Summarizing, the "All Cycles" signal is generated within the time interval from 270° of a machine cycle to 339° of the same machine cycle if a stop condition does not exist, if the primary and secondary card hoppers 10 and 11 both contain cards. Further, in order for the "All Cycles" signal to be generated if there are cards in the primary hopper 10 but none in the secondary hopper 11, then there must also be an absence of a secondary card in the first or number one card position of the secondary feed so as not to actuate the secondary card lever SCL1. If there are cards in the secondary card hopper 11 but none in the primary card hopper 10, then there must also be an absence of a primary card in the first or number one card position of the primary feed so as not to actuate the primary card lever PCL1. The "All Cycles" signal is also generated if the runout button is pressed.

With the circuits for developing the "All Cycles" control signal having been described, the circuits for impulsing the magnet driver 302 to energize the control magnet for the primary clutch 301 will now be described. The input to the magnet driver 302 is connected to the output of a logical OR circuit 330. Logical OR circuit 330 has ten input connections. These various input connections will now be described in terms of origin and function. A logical OR circuit 331 has an input connected to a plug hub 332 located on control panel 65 which, when wired, internally establishes circuits to control card feeding in a matching operation in an ascending sequence, and an input connected to the plug hub 333 also located on control panel 65; and, when wired, it internally establishes circuits to control card feeding in a merging operation in an ascending sequence.

The output of logical OR circuit 331 is connected to an input of a logical AND circuit 334 and to an input of a logical AND circuit 335. The output of logical OR circuit 331 is also connected to elements of the circuits for controlling the secondary clutch 305 which will be described later herein. Logical AND circuit 334 has another input connected to the output of driver 313 for receiving the "All Cycles" control signal, and an input connected to a terminal 336 which is wired to receive the delayed signal PCL2D. The function of logical AND circuit 334 is to condition logical AND circuits 337 and 338. As it will be seen shortly, logical AND circuit 337 develops a signal only if the secondary feed has not emptied, while logical AND circuit 338 develops a signal after the secondary feed has been emptied and cards still remain in the primary feed. This is possible because the cross-compare answers will always be low primary due to the bits developed by runout (see the Code Chart, FIG. 12) which are read into the secondary storage. Hence, a signal will be provided to energize the primary clutch 301 until cards are run out from the primary feed.

Logical AND circuit 335, in addition to the input connected to the output of logical OR circuit 331, also has an input connected to the output of driver 313 for receiving the "All Cycles" control signal, an input connected to a terminal 339 for receiving a signal from the equal cross-compare answer latch and an input connected to a terminal 340 for receiving the delayed signal SCL2D. The output of logical AND circuit 335 is connected to inputs of logical AND circuits 341 and 342. Essentially, logical AND circuit 341 functions to develop a signal for impulsing magnet driver 302 upon logical AND circuit 335 having passed a signal, upon the presence of the delayed signal PCL2D and upon receiving a signal from the high secondary sequence answer latch. Hence, the inputs to logical AND circuit 341 include an input connected to the terminal 343 for receiving a signal from the output of the high secondary sequence answer latch and an input connected to terminal 336 which receives the delayed signal PCL2D. The output of logical AND circuit 341 is connected to one of the inputs of logical OR circuit 330.

Logical AND circuit 342 also has its output connected to one of the inputs of logical OR circuit 330 and has, in addition to the input from the output of logical AND circuit 335, an input connected to terminal 336 for receiving the delayed signal PCL2D, and an input connected to the output of an inverter 344 which has its input connected to a terminal 345 which is connected to receive a signal from the output of the high primary sequence answer latch.

Logical AND circuit 337 which has one input connected to the output of logical AND circuit 334 also has an ipnut connected to terminal 340 for receiving the delayed signal SCL2D, and an input connected to a terminal 346 which is connected to receive a signal from the low primary cross-compare answer latch. Logical AND circuit 337 has its output connected to one of the inputs of logical OR circuit 330. Logical AND circuit 338, which also has one of its inputs connected to the output of logical AND circuit 334 additionally has an input connected to the terminal 346 for receiving a signal from the low primary cross-compare answer latch and an input connected to the output of an inverter 347 having its input connected to a terminal 348 for receiving a signal developed upon closure of the contact operated by the secondary hopper contact lever SHCL. The output of logical AND circuit 338 is connected to one of the inputs of logical OR circuit 330.

Logical AND circuit 349 has its output connected to one of the inputs of logical OR circuit 330. Logical AND circuit 349 performs the function similar to that of logical AND circuit 338. Logical AND circuit 349 has an input connected to the output of driver 313 for receiving the "All Cycles" control signal, an input connected to the output of an inverter 350 which has its input connected to the terminal 348 for receiving a signal developed upon the closure of the contact operated by the secondary card hopper contact lever SHCL, and an input connected to the output of an inverter 351 which has its input connected to terminal 340 which receives the delayed signal SCL2D.

Logical AND circuits 352 and 353 function to develop the signal for controlling the primary clutch 301 when the control panel 65 is utilized to direct the clutch action. Hence, the outputs of logical AND circuits 352 and 353 are connected to inputs of logical OR circuit 330. Logical AND circuit 352 has an input connected to terminal 340 for receiving the delayed signal SCL2D, an input connected to the terminal 336 for receiving the delayed signal PCL2D, an input connected to the output of driver 313 to receive the "All Cycles" control signal and an input connected to a plug hub 354 located on the control panel 65. Logical AND circuit 353 has an input connected to the output of the driver 313 for receiving the "All Cycles" control signal, an input connected to the output of terminal 336 for receiving the delayed signal PCL2D, an input connected to the plug hub 354, and an input connected to the output of the inverter 344 which indicates the absence of a card in the secondary card hopper.

Control over the primary clutch 301 during the run-in of cards from the primary card hopper 10 into the primary feed path is under control of a logical AND circuit 355 which has its output connected to one of the inputs of logical OR circuit 330. Logical AND circuit 335 has its input connected to the output of driver 313 for receiving the "All Cycles" control signal, an input connected to the terminal 356 for receiving a signal developed upon the closure of the contact operated by the primary hopper contact lever PHCL, and an input connected to the output of an inverter 357 which has its input connected to terminal 336 for receiving the delayed signal PCL2D. Hence, a signal is available to the magnet driver 302 under run-in conditions provided the primary hopper 10 contains cards. The "All Cycles" signal is always available during run-in or runout.

The primary clutch 301 is controlled during runout by a logical AND circuit 358 which has its output connected to one of the inputs of logical OR circuit 330. Logical AND circuit 358 has one input connected to the output of driver 313 for receiving the "All Cycles" control signal, an input connected to the output of inverter 357 and an input connected to the runout switch 326. It is seen that the runout requirements are similar to that for run-in except that there is no need for cards to be in the primary card hopper. Further, it is seen that the run-in and runout conditions no longer exist when three cards have been moved into the primary feed because the delayed signal PCL2D will be available.

Under stop conditions, it will be recalled that the "All Cycles" signal is no longer available. When this occurs, a special runout path is made available through the facility of a logical AND circuit 359, FIG. 10*a*, which has its output connected to one of the inputs of logical OR circuit 330 and has an input connected to the runout switch 326, an input connected to the output of an inverter 360 which has its input connected to the contact operated by the primary hopper contact lever PHCL, an input connected to the output of logical AND circuit 312 for receiving an "Error All Cycles" signal and an input connected to a terminal 361 for receiving a signal indicating that the primary clutch 301 has been energized. Because of the inverter 360, it is seen that, in order to energize the primary clutch 301, the cards must be removed from the primary hopper to assure that the error condition is corrected before additional cards are fed.

In some instances, it is desirable to advance a record card from the primary feed path into the card-stacking receptacles 14 without disturbing the position of the other cards in the primary feed path. This is accomplished by means of the eject clutch 303, FIG. 10*b*, which controls the operation of cooperating feed rollers 36 and 37. It will be recalled that, as cards are advanced by the cooperating feed rollers 36 and 37, they enter between the bite formed by the continuously running cooperating feed rollers 40 and 41, and will then be conveyed relative to the card-stacking receptacles 14. Hence, the eject clutch 303 must be activated whenever the primary clutch 301 is activated so as to avoid any card jams. Therefore, the output of logical OR circuit 330, FIG. 10*a*, is also connected to one of the inputs of a logical OR circuit 365, FIG. 10*b*, which has its output connected to the magnet driver 304 for controlling the magnet of the eject clutch 303.

In addition to the energization of the eject clutch 303 whenever the primary clutch 301 is energized, the eject clutch 303 is energized independent of the energization of the primary clutch 301 during a merge or match operation depending upon the answers developed by the compare circuitry 161. The eject clutch 303 will not be energized unless there is a card present in the final or third position of both the primary and secondary feeds; i.e., just before entering the continuously running feed rollers for conveying the record cards relative to the card-stacking receptacles 14. Additionally, the eject clutch 303 can be controlled from the control panel 65. The signals for energizing the eject clutch 303 are connected to inputs of logical OR circuit 365. FIG. 10*b*. A logical AND circuit 366 has an input connected to the output of logical OR circuit 331, FIG. 10*a*, an input connected to the terminal 340 for receiving the delayed signal SCL2D and and an input connected to terminal 339 which is connected to receive a signal from the equal cross-compare answer latch.

The output of logical AND circuit 366 is connected to one of the inputs of a logical AND circuit 367 which has its output connected to logical OR circuit 365. In addition to the input connected to the output of logical AND circuit 366, logical AND circuit 367 has an input connected to terminal 336 for receiving the delayed signal PCL2D, an input connected to the output of driver 313 for receiving the "All Cycles" control signal, and an input connected to a terminal 368 which is connected to receive a signal from the equal secondary sequence answer latch.

The eject clutch 303 is also controlled from the control panel through the facility of a plug hub 370 which is internally wired to inputs of logical AND circuits 371 and 372. The outputs of logical AND circuits 371 and 372 are connected to inputs of logical OR circuit 365. In addition to the input from the plug hub 370, logical AND circuit 371 has an input connected to the output of driver 313 to receive the "All Cycles" control signal, an input connected to terminal 336 to receive the delayed signal PCL2D, and an input connected to the output of an inverter 373 which has its input connected to the contact operated by the lever in the secondary hopper SHCL. Logical AND circuit 372 has an input connected to the output of driver 313 for receiving the "All Cycles" control signal, an input connected to terminal 336 for receiving the delayed signal PCL2D and an input connected to terminal 340 for receiving the delayed signal SCL2D.

The secondary clutch 305, FIG. 10*b*, is selectively energized by means of a magnet driver 306 which has its input connected to the output of a logical OR circuit 380 which has eleven inputs. The indication of a merge or match operation is provided by connecting the output of logical OR circuit 331, FIG. 10*a*, to inputs of logical AND circuits 381, 382 and 383, FIG. 10*b*. Each of these logical AND circuits has an input connected to the output of driver 313 for receiving the "All Cycles" control signal. Logical AND circuit 381 also has an input connected to terminal 340 for receiving the delayed signal SCL2D. Logical AND circuit 382 also has an input connected to terminal 340 for receiving the signal SCL2D and has an input connected to a terminal 384 which is connected to receive a signal from the equal cross-comparison answer latch. Logical AND circuit 383 additionally has inputs connected to receive the delayed signal PCL2D, and the delayed signal SCL2D, and an input connected to a terminal 385 which is connected to receive the signal from the low secondary cross-comparison answer latch.

A logical AND circuit 386 controls the energization of the secondary clutch 305 during runout under an error condition. Hence, it has an input connected to the output of logical AND circuit 312 for receiving the "Error All Cycles" signal, an input connected to receive the runout signal, an input connected to receive the secondary feed check signal which indicates that the secondary clutch was operated, and an input connected to the output of an inverter 387 having its input connected to the contact operated by the secondary hopper contact lever SHCL.

A logical AND circuit 388 has an input connected to the output of logical AND circuit 381, an input connected to the output of an inverter 389 which has its input connected to the contact operated by the primary hopper contact lever PHCL and an input connected to a terminal 390 which is connected to receive a signal from the low secondary sequence answer latch. The output of the logical AND circuit 388 is connected to an input of the logical OR circuit 280.

A logical AND circuit 391 has its output also connected to one of the inputs of the logical OR circuit 380 and has an input connected to the output of logical AND circuit 382, an input connected to receive the delayed signal PCL2D and an input connected to a terminal 392 which is connected to receive a signal from the high primary sequence answer latch.

Logical AND circuits 393 and 394 each has its output connected to an input of logical OR circuit 380 and each has an input commonly connected to the match plug hub 332. Logical AND circuit 393 also has an input connected to the output of inverter 389, an input connected to the output of logical AND circuit 382 and an input connected to a terminal 395 which is connected to receive a signal from the equal secondary sequence answer latch. Logical AND circuit 394, in addition to having an input connected to the match plug hub 332, also has an input connected to the terminal 395, an input connected to receive the delayed signal PCL2D and an input connected to the output of logical AND circuit 382.

Logical AND circuits 396 and 397 function to control the secondary clutch 305 from the control panel. Each of these logical AND circuits has its output connected to an input of logical OR circuit 380 and each has one of their inputs commonly connected to a control panel plug hub 398. Logical AND circuit 396 additionally has an input connected to receive the delayed signal PCL2D, an input connected to the output of the driver 313 for receiving the "All Cycles" control signal and an input connected to receive the delayed signal SCL2D. The additional inputs to the logical AND circuit 397 include an input connected to the output of driver 313 for receiving the "All Cycles" control signal, an input connected to receive the delayed signal SCL2D and an input connected to the output of the inverter 389.

Logical AND circuit 400 has its output connected to one of the inputs of logical OR circuit 380 and has an input connected to receive the "All Cycles" control signal, an input connected to the output of an inverter 401 which has its input connected to the contact operated by the primary hopper contact lever PHCL and an input connected to the output of an inverter 402 which has its input connected to receive the delayed signal PCL2D. A logical AND circuit 403 controls the secondary clutch 305 during runout conditions and has its output connected to one of the inputs of logical OR circuit 380. Logical AND circuit 403 has an input connected to the output of driver 313 for receiving the "All Cycles" control signal, an input connected to the runout switch 322 and an input connected to the output of an inverter 404 which has its input connected to the contact operated by the primary hopper contact lever PHCL. Logical AND circuit 405 has its output connected to one of the inputs of the logical OR circuit 380 and it includes an input connected to the output of driver 313 for receiving the "All Cycles" control signal, an input connected to the output of inverter 404 and an input connected to the contact operated by the secondary hopper contact lever SHCL.

The directing of the primary and secondary cards into the card-stacking receptacles 14 is under the control of magnets M1, M2, which control the entrance of the primary cards into card-stacking receptacles 42 and 43, and magnets M3 and M4 which control the directing of the secondary cards into card-stacking receptacles 44 and 45, respectively, FIGS. 1 and 10*b*. The primary cards are automatically deflected into card-stacking receptacle 42, FIG. 1 if neither magnets M1 nor M2 are energized. Likewise, the secondary cards are automatically directed into card-stacking receptacle 44 if magnets M3 or M4 are not energized. The energization of the magnets M1, M2, M3 and M4 is always accomplished through wiring at the control panel 65. Further, the "All Cycles" signal gates the control signal to the magnets M1, M2, M3 and M4 to insure proper timing of the signal for energizing these magnets. The magnets M1, M2, M3 and M4 are connected to magnet drivers 420, 421, 422 and 423, respectively.

Magnet driver 420 has its input connected to the output of a logical OR circuit 424 which has an input connected to the output of a logical AND circuit 425 and another input connected to the output of a logical AND circuit 426. The logical AND circuit 425 has one input connected to the output of the driver 313 for receiving the "All Cycles" control signal and an input connected to a control panel plug hub 427. Logical AND circuit 426 has an input connected to the output of the driver 313 and an input connected to a control panel plug hub 428. The output of the logical AND circuit 426 is connected to the input of driver 421 as well as to the input of logical OR circuit 424; consequently, whenever magnet M2 is energized, magnet M1 is simultaneously energized. Magnets M1 and M2 are simultaneously energized to direct a primary card into the merge pocket or stacking receptacle 46. Energization of magnet M1 alone causes a primary card to be directed into the card-stacking receptacle 43.

Similarly, the input to magnet driver 422 is connected to the output of a logical OR circuit 429 which has one input connected to a logical AND circuit 430 and another input connected to the output of a logical AND circuit 431. One input to the logical AND circuit 430 is connected to the output of the magnet driver 313 for receiving the "All Cycles" control signal and the other input to the logical AND circuit 430 is connected to a plug hub 432 located on the control panel 65. Logical AND circuit 431 has an input connected to the output of driver 313 for receiving the "All Cycles" control signal and an input connected to a plug hub 433 located on the control panel 65. The output of logical AND circuit 431 is also connected to the input of driver 423; hence, whenever driver 423 is activated to energize magnet M4, magnet driver 422 will also be activated to energize magnet M3, thereby directing a secondary card into the common or merge card-stacking receptacle 46. When magnet M3 is energized alone, the secondary card is directed into the card-stacking receptacle 45.

*Machine start and stop controls*

Stop control 250, FIGS. 1 and 2*a*, provides the controls for motor M, FIG. 11. The operation of a motor M is under control of a master relay MR which operates a normally open contact MR1 connected in the motor circuit between the motor and ground potential, the other side of the motor being connected to an A.C. voltage. The relay MR is connected between a plus voltage and a magnet driver 500. The magnet driver 500 has its input connected to the output of the logical OR circuit 501. The logical OR circuit 501 has one input connected to the output of a run latch 502 and another input connected to the output of the start latch 503. The run latch 502 has its set terminal connected to the output of a logical AND circuit 504 and its reset terminal connected to the output of a logical AND circuit 505.

A logical AND circuit 504 has an input connected to the output of a delay network 506, an input connected to the output of the tenth winding of the magnetic impulse generator 76 and an input connected to the output of the start latch 503 associated with the set or on side thereof. Logical AND circuit 505 has an input connected to the off side of the start latch 503 and an input connected to the ninteenth winding of the magnetic impulse generator. Hence, the motor may be started only when the run latch 502 is on, and the run latch 502 is set on only when the start latch 503 is on.

The start latch 503 has its set terminal connected to a start key SK. The reset terminal of the start latch 503 is connected to the output of a logical OR circuit 507. Logical OR circuit 507 has an input connected to a stop key STK, an input connected to a contact operated by a pocket stop lever PS and an input connected to the output of a logical AND circuit 508. Hence, a depressing of the stop key STK or having the pocket switch PS operated by cards entering and filling one of the card-stacking receptacles 14 will cause the resetting of the start latch 503, therefore, turning off the run latch at approximately 0° of a machine cycle to stop the machine. Of course, the machine will also be stopped if the conditions of logical AND circuit 508 are met. These conditions will be described shortly. Delay network 506 functions to delay the setting of the run latch 502 and thereby delaying the operation of the clutches to insure that sufficient cards are in the primary and secondary card hoppers. After a stop has occurred, this delay is not needed and, therefore, the run latch can be set after the master reset button or key MRK and the start key SK are depressed in sequence.

While the stop key STK and the pocket switch PS function to stop the machine, other conditions prevailing while the machine is in operation will also generate signals for stopping the machine. Generally speaking, abnormal card movement or abnormal operation of the clutches will stop the machine. Errors created during the encoding of data into storage, which when detected by the validity checking circuitry or checking circuitry will stop the machine. Connections from the control panel will stop the machine when certain conditions exist. Termination of operation will also stop the machine. Generally speaking, stop functions are generated by both the mechanism in the primary side and secondary side of the machine. However, since these are substantially identical, only the logic for generating the stop function for the primary side of the machine will be shown in detail, and the apparatus for generating the stop functions for the secondary side of the machine are indicated by lock 510 which has its output connected to one of the inputs of the logical OR circuit 511.

Logical OR circuit 511 also has an input connected to the output of an inverter 512 which has its input connected to the power supply voltage. Hence, in the event of a power failure for power supply, the machine will stop. The other input to logical OR circuit 511 is connected to the output of a primary stop latch 513 which is associated with the set side thereof. The reset terminal of the primary stop latch 513 is connected to the master reset switch MRK. The set terminal of the primary stop latch 513 is connected to the output of a logical OR circuit 514 having inputs connected to the outputs of logical AND circuits 516, 517, 518, 519, 520, 521, 522 and 523. Logical AND circuit 516 functions to indicate the card jam at the primary card lever PCL1. Logical AND circuit 516 has an input connected to the contact operated by the primary card lever PCL1, an input connected to the output of the tenth winding of the magnetic pulse generator 76 and an input connected to the output of a latch 524 set by the output of the winding of a pulse generator 525 which is similar to the magnetic pulse generator 76 except for the fact that it is a single output winding and that it is not continuously operating but is connected to be operated by the primary feed clutch 301 so as to provide an indication as to whether or not the primary feed clutch 301 has been operated or if the primary feed clutch has been operated when it should not have been operated.

Logical AND circuit 517 functions to indicate when the primary clutch 301 has failed to engage upon a valid signal for energizing the primary clutch and it includes an input connected to the output of an inverter 526 which has its input connected to the output of latch 524, an input connected to the nineteenth winding of the magnetic pulse generator 76 and an input connected to a terminal 527 which is connected to receive a signal for energizing the primary clutch; i.e., a signal coming from the output of logical OR circuit 330, FIG. 10*a*.

Logical AND circuit 518 functions to indicate a jam at the primary card lever PCL2 and has an input connected to the output of the latch 524, an input connected to the output of the eighth coil of the magnetic pulse generator 76 and an input connected to receive a signal generated by the primary card lever PCL2.

Logical AND circuit 519 functions to indicate when the primary clutch 301 has engaged without an instruction to engage and has an input connected to the output of an inverter 530 which has its input connected to receive the signal from the output of logical OR circuit 330; i.e., the signal for energizing the primary clutch 301, an input connected to the output of the latch 524, and an input connected to the output of the nineteenth winding of the magnetic impulse generator 76.

Logical AND circuit 520 functions to indicate a primary card feed failure and has an input connected to the output of latch 524, an input connected to the contact operated by the primary hopper contact lever PHCL, an input connected to the output of an inverter 531 having its input connected to the contact operated by the primary card lever PCL1 and an input connected to the output of the fourteenth winding of the magnetic impulse generator 76. Logical AND circuit 521 functions to indicate a card gap and it has an input connected to the output of the fourteenth winding of the magnetic pulse generator 76, and an input connected to the output of an inverter 532 which has its input connected to the contact operated by the primary card lever PCL2 and an input connected to a terminal for receiving a delayed signal PCL1D developed by delaying the signal generated as the contacts are closed by the primary card lever PCL1.

Logical AND circuit 522 functions to develop a stop signal under program control such as when cards are out of sequence for merge or match operations or whenever primary stop plug hubs at the control panel 65 are impulsed through suitable control panel wiring. Logical AND circuit 522 has one input connected to receive the "All Cycles" control signal, another input connected to receive the delayed signal PCL2D and an input connected to the output of the logical OR circuit 533. Logical OR circuit 533 has an input connected to a primary stop plug hub 534 and an input connected to the output of a logical AND circuit 535. Logical AND circuit 535 has an input connected to either the merge or match plug hub 536 and an input connected to a terminal 537 which is connected to receive a signal from the low primary sequence answer latch.

Logical AND circuit 523 functions to generate a stop signal due to errors developed during encoding of data which are detected by the code check latch 234 of the checking circuitry. Hence, one input of logical AND circuit 523 is connected to the output of the code check latch 234 and the other input of logical AND circuit 523 is connected to the output of an inverter 538 which has its input connected to a terminal 539 which is connected to the output of the driver 313 to receive the "All Cycles" control signal. Hence, logical AND circuit 523 develops a signal for errors in encoding, for invalid double punches, for blank columns when the same are detected as errors, for dropped bits of data and for excess bits of data in the primary and primary sequence planes of storage. During "All Cycles" time, any errors which might occur during the transfer of data in data storage are stored in a latch to permit the primary clutch to engage before the signal is transmitted as a stop function. Therefore, the transfer of data from the primary sequence and secondary sequence planes to the primary and secondary planes can be completed and the stop function is available before the subsequent clutch cycle can take place.

With reference to FIG. 10*a*, it is seen that the "All Cycles" signal will not be generated when a stop condition exists. The influence of a stop function relative to the motor M, FIG. 11, is effected through the inhibition of the "All Cycles" signal which, in turn, inhibits all signals to the clutches. The failure to detect that a clutch has engaged at approximately 349.5° of a machine cycle; i.e., the indication provided by the 18th coil winding of the magnetic pulse generator 76, turns off the start latch 503. This is accomplished by means of the logical AND circuit 508, FIG. 11. Logical AND circuit 508 has an input connected to the output of the run latch 502, an input connected to the output of an inverter 540 which has its input connected to the output of a latch 541 having its set terminal connected to the coil winding of a magnetic impulse generator 542 which is operated by the secondary clutch 305 to generate a check impulse, an input connected to the output of an inverter 543 which has its input connected to the output of latch 524, and an input connected to the output of the eighteenth coil winding of the magnetic impulse generaor 76. When the start latch 503 is turned off, the run latch 502 is turned off at approximately 0° of a machine cycle through the facility of the impulse provided by the nineteenth coil of the magnetic impulse generator 76. It is also seen that, when the machine runs out of cards, it stops because the card levers in the primary and secondary card paths, independently of the stop function, prevent clutch signals from being generated.

*Machine Operation*

Figure 17:
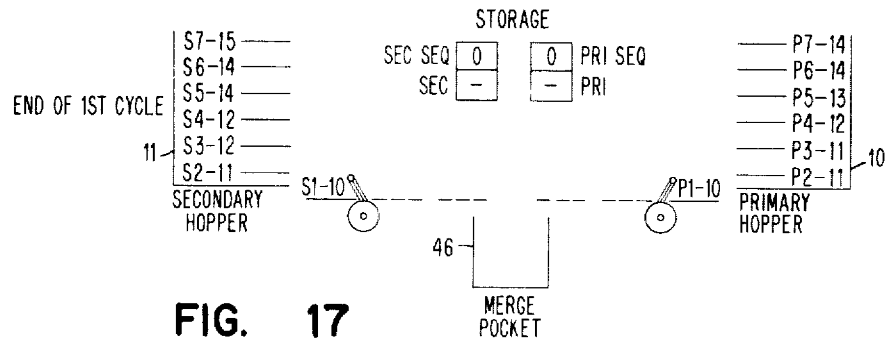

For purposes of example, the operation of the machine will be described in connection with the merging of two groups of cards contained in the primary and secondary hoppers, respectively, as shown in FIG. 17. In the particular example illustrated, there are seven cards in the primary hopper and seven cards in the secondary hopper. The data contained in each particular card is indicated to the right of the card number; for example, the first primary card P1 contains coded data representing the value 10. Similarly, the first secondary card contains coded data representing the value 10.

The control panel wiring for this particular merge operation is shown in FIG. 16. In this example, the data contained in the primary and secondary cards are located in the first two columns of the cards. Hence, the first two plug hubs for Primary Read and Secondary Read are wired to the first two plug hubs for Primary Sequence Entry and Secondary Sequence Entry. By this control panel wiring, the data read from the first two columns of the primary and secondary cards will be transferred into primary sequence and secondary sequence storage into positions 1 and 2 of these core storage planes. Since this is a merge operation, the merge terminal 333 will be wired. Further, since this is a merge operation, all cards will be stacked in the card-stacking receptacle 46 for every machine cycle. Hence, the "All Cycles" signal available at the control panel will be transferred by means of a plug wire to the plug hub for pocket 3, which is pocket 46 of the drawings, for both the primary and secondary sides; i.e., terminal 428 and terminal 433, FIG. 10*b*, will be connected to receive an "All Cycles" signal, thereby conditioning logical AND circuits 426 and 431 to energize drivers 420 and 421, 422 and 423 and thus energize magnets M1, M2, M3 and M4 to direct both the primary and secondary cards into the merge pocket or card-stacking receptacle 46.

Since the first columns of the primary and secondary cards contain numeric information which is to be analyzed, the merge operation starts out in the numeric mode with blanks detected as errors, and continues in this mode through the second column. Thereafter, because the rest of the columns of the primary and secondary cards will be blank and this condition is valid, the mode is switched to the numeric mode with blanks equal to zero. The control panel wiring for this arrangement is shown in FIG. 16. It is seen that the plug hubs of the position ring for position 1 are wired to the plug hubs for both the primary and secondary for the numeric mode control with blanks detected as errors. Since the mode latches, once set, remain set until reset, it is unnecessary to wire the plug hubs for the second position of the position ring to the mode control latches. However, because the mode is to change for the third column, the plug hubs for the third position of the position ring are wired to the numeric mode blank equals zero mode control plug hubs. This completes the control panel wiring for the particular merge operation.

With reference again to FIG. 17, the planes for primary sequence storage, secondary sequence storage, primary storage and secondary storage are illustrated by blocks and the data contained within these storage areas is indicated within the blocks. With power onto the machine, depression of the start key SK, after initial delay of about 2.5 seconds to allow cards to move from the file feed (not shown) to the primary and secondary hoppers 10 and 11, the picker knives 16 and 17, FIG. 1, feed the first primary and secondary cards from the respective card hoppers. The positions of the first primary and secondary cards at the end of the first cycle are shown in FIG. 17. Because the first primary and secondary cards at this time have not been read, there will be no information in the primary sequence and secondary sequence storage planes as well as in the primary and secondary planes. The condition of the primary and secondary storage planes is actually unknown at this time. However, the primary sequence and secondary sequence storage areas will be in the zero state because of the read and data transfer operation.

The machine automatically feeds two cards in each feed in two machine cycles. This is accomplished by means of the primary and secondary card levers and the resulting delay signals in connection with the run-in circuitry discussed earlier herein. During the first machine cycle of run-in, cards are moved under primary and secondary card levers PCL1 and SCL1, respectively. The brush drivers are not turned on in the first cycle because they are conditioned by the signals produced by the card levers PCL1 and SCL1. Hence, after data read and transfer time during the first cycle, the primary and secondary sequence planes are left in the zero or erase state. All code checks and low sequence answers for both primary and secondary sequence which may occur during the first two machine cycles are automatically suppressed and, at the same time, a high sequence answer is forced.

Figure 18:
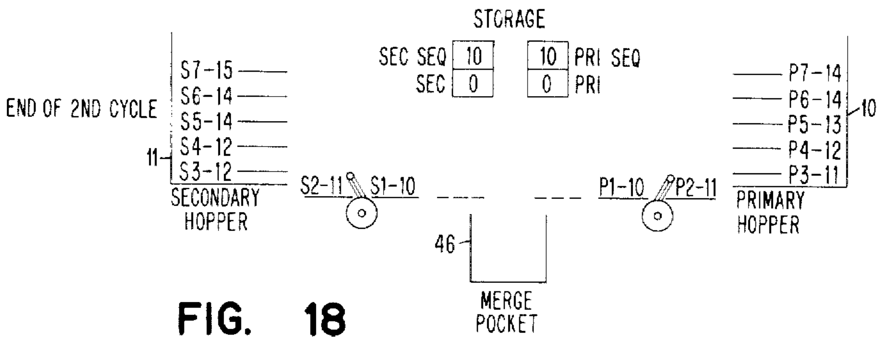

At the beginning of the second machine cycle, the zero states of the cores in the primary and secondary sequence planes are transferred to the primary and secondary planes respectively. Also, during the second machine cycle the primary and secondary cards P1 and S1 are moved to the second card station and the primary and secondary cards P2 and S2 are removed from the primary and secondary hoppers to the first feed stations, respectively. As the primary and secondary cards P1 and S1 move to the second station, they are read and the data read therefrom is entered into primary sequence and secondary sequence storage, respectively. The conditions prevailing at the end of the second cycle are illustrated in FIG. 18. It is seen that both the primary and secondary cards P1 and S1 contain the numeric value "10"; hence; both primary sequence storage and secondary sequence storage contains the values "10" while primary storage and secondary storage contain the value "0." It takes two positions in storage to represent the value "10," this value consisting of two characters.

Figure 19:
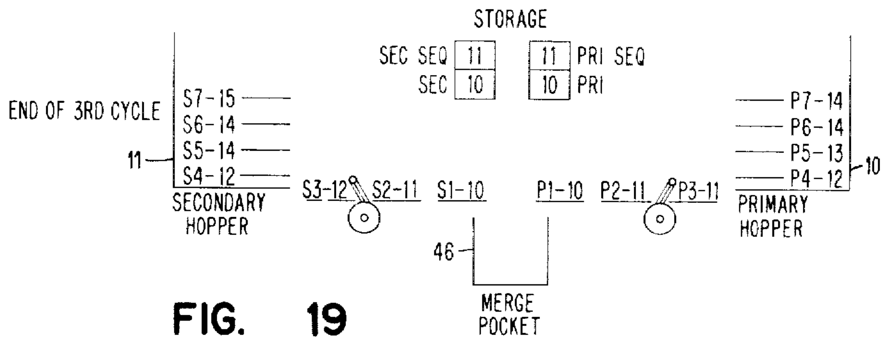

Following the reading of the primary and secondary cards P1 and S1, the compare operation takes place. During the compare operation, data is read from each storage area serial by bit and serial by position. The answers resulting from this compare operation will indicate high primary sequence, high secondary sequence and equal cross-compare because "10" compares high relative to "0," the collating sequence has been indicated earlier herein, and the zero value in primary storage compares equal to the zero value of secondary storage. Consequently, primary and secondary cards will be fed from the primary and secondary card hoppers during the third machine cycle. The data which had been in primary sequence storage and secondary sequence storage is transferred to primary storage and secondary storage, respectively. Further, the data from the primary and secondary cards P3 and S3 are read into primary sequence storage and secondary sequence storage, respectively. The answers for the third cycle of operation, which is represented in FIG. 19, will be high primary sequence, high secondary sequence, and equal cross-compare. Hence, both the primary and secondary feeds will be operated during the fourth cycle.

Figure 20:
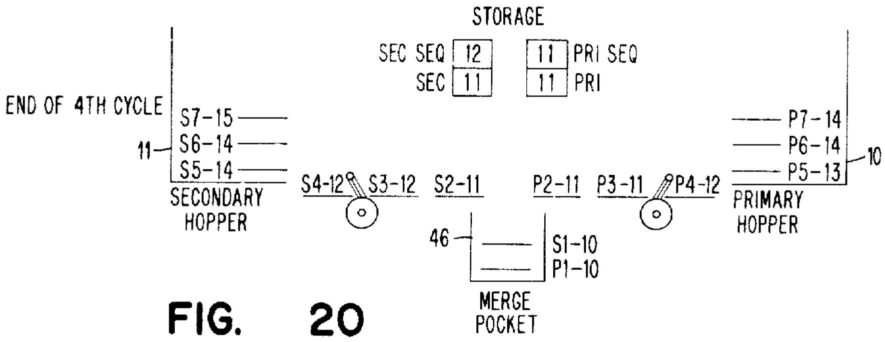

During the fourth cycle, primary and secondary cards S1 and P1 will enter into the merge pocket 46. At the end of the fourth machine cycle, the answer for primary sequence is equal, the secondary sequence is high and the cross-compare is equal. This particular combination of answers causes only the primary feed to be actuated during the fifth machine cycle. The conditions prevailing at the end of the fourth machine cycle are represented in FIG. 20.

Figure 21:
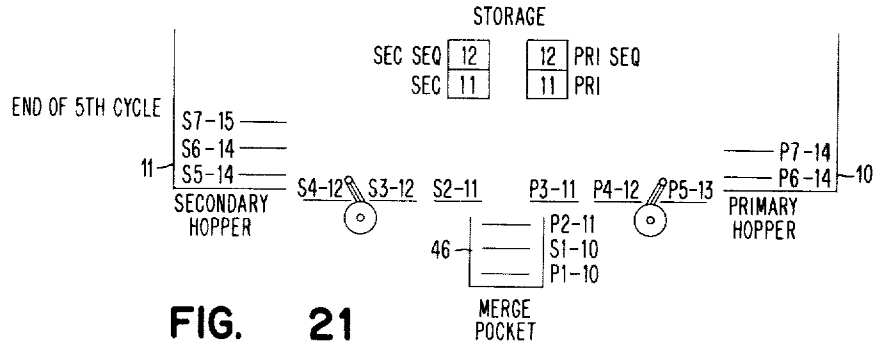
Figure 22:
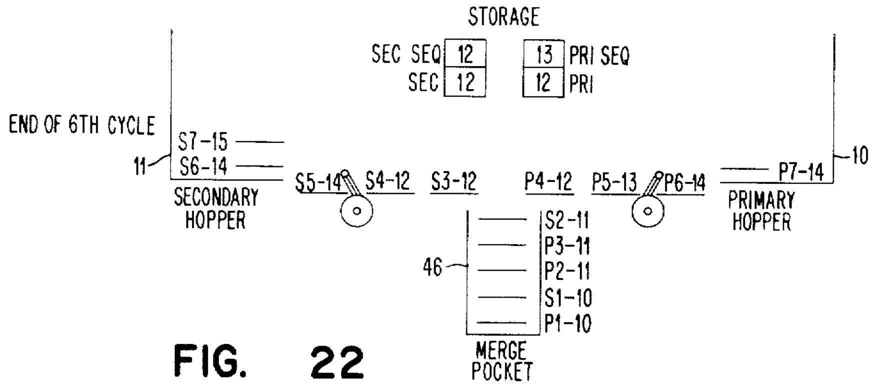

At the end of the fifth machine cycle, primary card P2 will have entered the merge pocket 46. The answer for primary sequence is high, for secondary sequence is high and for cross-compare is equal. These conditions are represented in FIG. 21. Hence, both the primary and secondary feeds will be operated during the sixth machine cycle. At the end of the sixth machine cycle, primary and secondary cards P3 and S2 will have entered the merge pocket 46. Examination of storage will indicate that the answers for primary sequence is high, secondary sequence is equal, and cross-comparison is equal. These answers cause the secondary feed to be activated and the eject clutch of the primary feed to be activated. The primary clutch will not be activated because such action would change the data content in primary sequence storage; and, in order to collate properly, the content in primary sequence storage and primary storage must be retained for another machine cycle. Accordingly, during the seventh machine cycle, the primary card P4 will enter the merge pocket 46 by action of the eject clutch and the secondary card S3 will also enter the merge pocket 46 by action of the secondary clutch. The primary clutch will not be activated to feed a card from the primary hopper.

Figure 23:
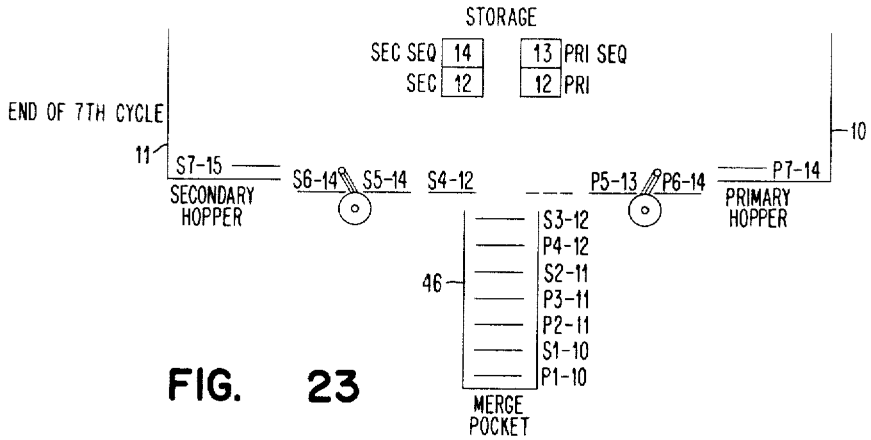
Figure 24:
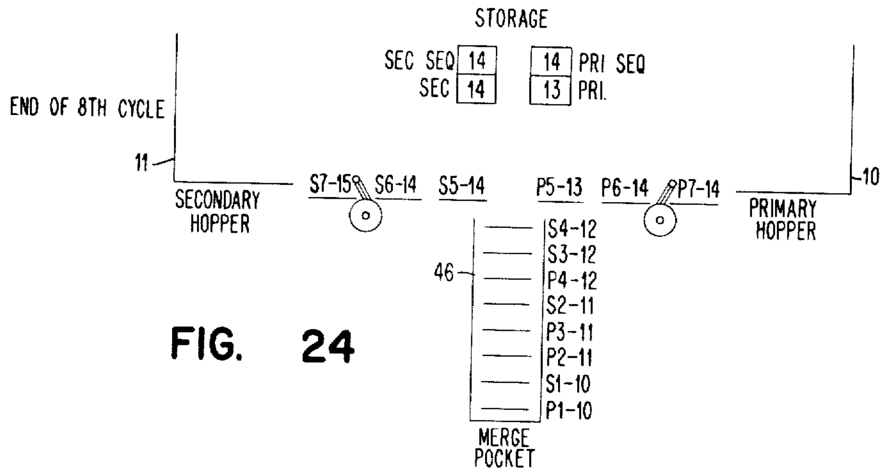

Examination of storage at the end of the seventh cycle indicates that the primary sequence answer is high, the secondary sequence is high, and the cross-comparison answer is equal. Therefore, during the eighth machine cycle, both the primary and secondary feeds will be operated to move the cards from the primary and secondary card hoppers, respectively. The conditions prevailing at the end of the seventh cycle are shown in FIG. 23. In FIG. 24, it is seen that both the primary and secondary hoppers are empty and that the secondary card S4 has now entered the merge pocket 46. A primary card would not enter the merge pocket 46 on the eighth cycle because the primary card P4 was ejected during the seventh cycle into the merge pocket 46 by the eject clutch. Examination of storage at the end of the eighth cycle indicates that the answers will be high primary sequence, equal secondary sequence, and low primary cross-compare. Hence, during the ninth cycle, only the primary feed will be activated. With the completion of the eighth machine cycle, the primary and secondary hoppers are both empty and, consequently, the machine stops because of the interruption of the "All Cycles" signal. It now becomes necessary for the machine operator to press the runout button to force an "All Cycles" signal because both hoppers are empty. It is necessary to depress the runout button until all cards have moved from both the primary and secondary feeds. Had only one hopper been empty, it would only be necessary to depress the runout button for a single clutch cycle at a time for the side that had been emptied, and automatic feeding would continue in connection with the other side so long as cards remain in the hopper for that particular side.

Figure 25:
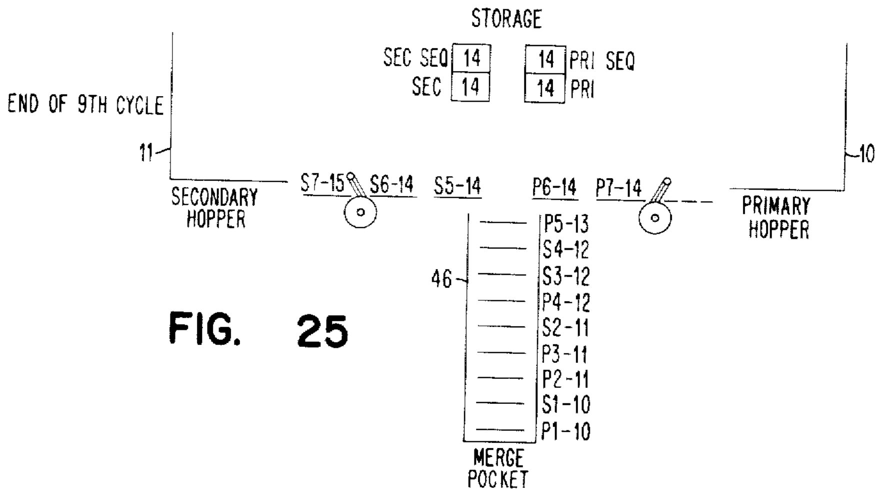

During the ninth cycle, primary card 15 enters the merge pocket 46. A secondary card does not enter the merge pocket 46 because the secondary clutch had not been operated. The conditions prevailing at the end of the ninth cycle are represented in FIG. 25. Examination of storage indicates that the answers will be equal primary sequence, equal secondary sequence, and equal cross-compare.

Figure 26:
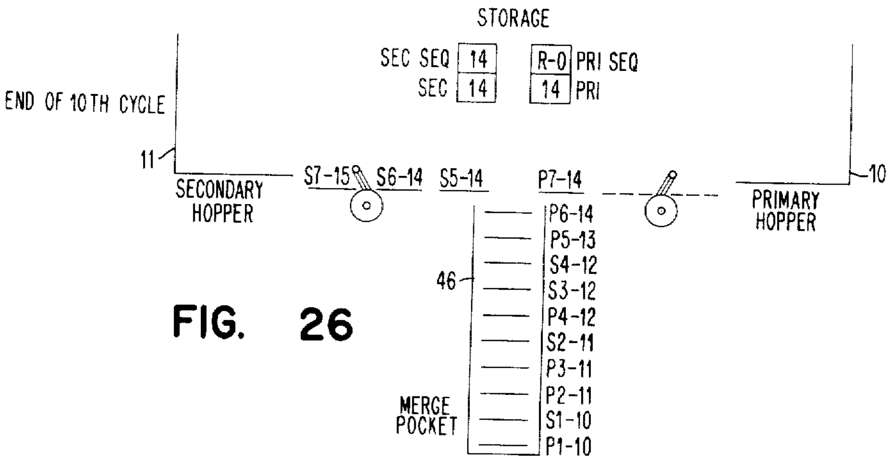
Figure 27:
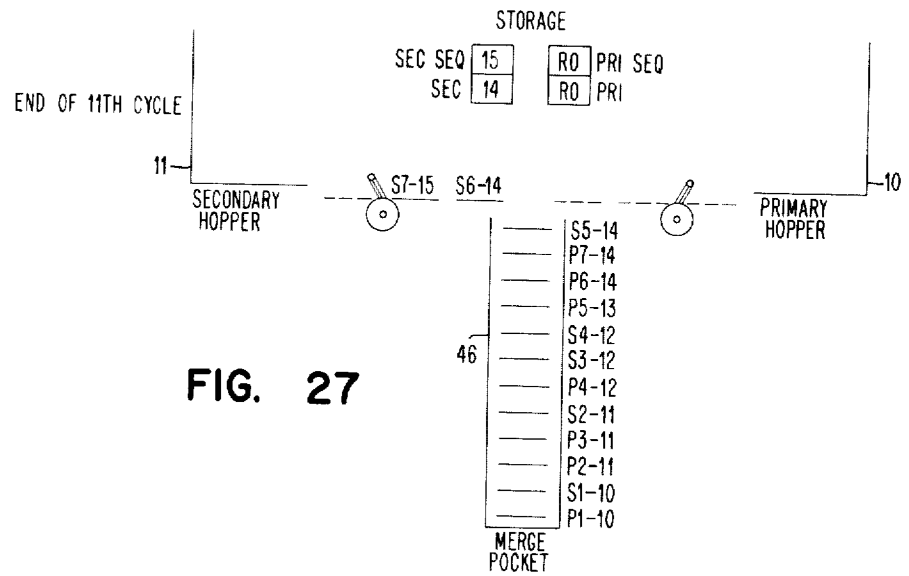
Figure 28:
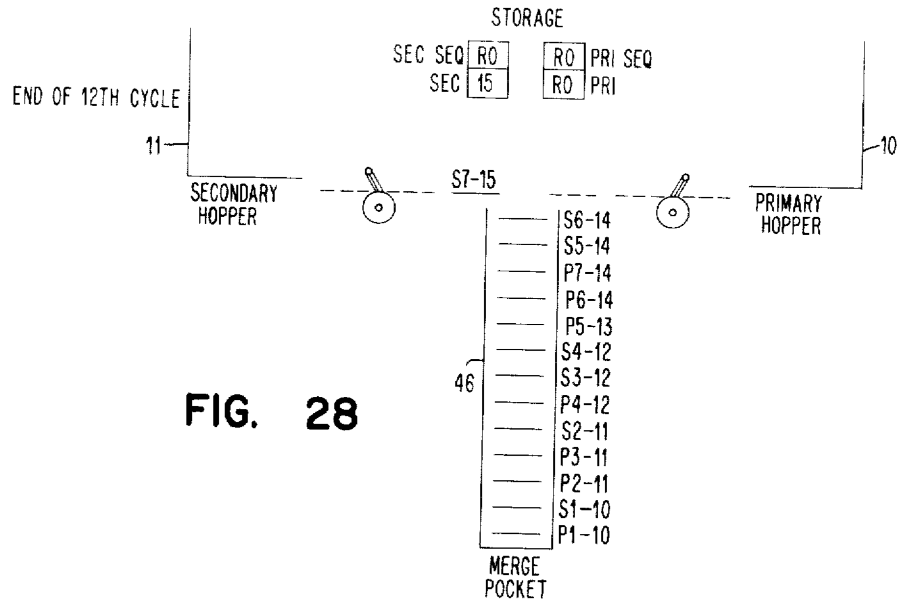

Accordingly, during the tenth machine cycle, only the primary feed will be operated in order to place the primary card P6 into the merge pocket 46. During the tenth cycle, the code for the runout condition, see FIG. 12, is written into the primary sequence plane because of the absence of a card at the first card position in the primary feed, see FIG. 26. The runout character, FIG. 12, is represented by bits E and D, and these bits insure a high primary sequence answer to permit normal collating for the last cards. The conditions prevailing at the end of the tenth cycle are shown in FIG. 26. Examination of storage indicates a high primary sequence, an equal secondary sequence, and an equal cross-compare. During the eleventh cycle, because of the answers generated during the tenth cycle, only the eject clutch and the secondary clutch will be activated. Hence, at the end of the eleventh cycle, FIG. 27, the primary card P7 and the secondary card S5 will have entered the merge pocket 46 and all primary cards will have been fed from the primary feed while the secondary cards S6 and S7 will remain in the secondary feeds. Examination of storage at the end of the eleventh cycle indicates equal primary sequence, high secondary sequence, and low secondary cross-compare. Because of these conditions, the secondary clutch will be activated during the twelfth machine cycle, and the secondary card S6 will enter the merge pocket 46 during the twelfth machine cycle. The machine automatically stops at the end of the twelfth machine cycle and it is again necessary to press the runout button to empty the secondary feed, whereby the secondary card S7 will enter the merge pocket 46.

While the invention has been particularly shown and described with reference to a preferred embodiment thereof, it will be understood by those skilled in the art that various changes in form and details may be made therein without departing from the spirit and scope of the invention.

What is claimed is:

1. Record card controlled apparatus comprising: primary and secondary data sensing devices; means for feeding primary and secondary record cards relative to said primary and secondary sensing devices to enable the same to derive the data of said primary and secondary cards; a magnetic core storage matrix having first, second, third and fourth data storage areas, said first and second data storage areas being connected to said primary and secondary data sensing devices to receive data derived from said primary and secondary cards; data checking means connected to said storage matrix for checking data entered therein and having elements for generating data if certain predetermined connections are found to exist; means for selectively transferring data from said storage matrix to said data checking means; and means for transferring data passed from said first and second storage areas to said data checking means including data generated by said checking means to said third and fourth data storage areas whereby said first and second data storage areas become vacant to receive additional data from said primary and secondary sensing devices so that said storage matrix holds data in said first, second, third, and fourth storage areas to facilitate data comparing operations of the data held therein.

2. Record card controlled apparatus as in claim 1 further comprising: first data comparing means connected to said storage matrix for comparing the data in the first storage area with the data in the third storage area, second data comparing means connected to said storage matrix for comparing data in the second storage area with the data in the fourth storage area, and third data comparing means connected to said storage matrix for comparing data in said third storage area with the data in said fourth storage area.

3. In record card controlled apparatus: primary and secondary record card sensing devices disposed in primary and secondary card paths, data storage means operably connected to receive data from said primary and secondary record card sensing devices, a plurality of single bit data registers connected to said data storage means to receive data therefrom simultaneously, data transfer means selectively operable to effect the transfer of data from said data storage means to said registers, means for entering data transferred to said register into said data storage means; and data comparing means operably connected to said registers for comparing the contents of one of the registers with that of another.

4. In record card controlled apparatus as in claim 3 wherein said data transfer means includes a bit ring having a plurality of positions for controlling the readout of data from said data storage means on a bit-by-bit basis for each data character in storage and a position ring having a plurality of positions for controlling the order for reading out the data characters.

5. In record card controlled apparatus as in claim 4 further comprising: a plurality of mode control switches connected to be operably controlled by said position ring, and means for connecting said data comparing means under control of said mode control switches to enable said data comparing means to compare data in different modes for each data character.

6. In record card controlled apparatus as in claim 5 further comprising: data checking means operably connected to said plurality of registers to check the bit configuration for each data character.

7. In record card controlled apparatus as in claim 6 wherein said data checking means is connected under control of said mode control switches to enable the data checking means to check the bit configuration of each data character in different modes.

8. In record card controlled apparatus as in claim 7 further comprising: error detection means operably connected to said data checking means so as to provide an indication of an error upon said data checking means being set in a particular state by the bit configuration of a data character.

9. In record card controlled apparatus as in claim 8 wherein said error detection means is connected under control of said mode switches to enable said error detection means to provide an indication of an error for each data character in different modes.

10. In record card controlled apparatus, data storage means having four data storage areas, each storage area having a predetermined number of bit positions to comprise a character, there being a predetermined number of character positions; primary and secondary card sensing devices disposed in primary and secondary card paths; means connecting said primary and secondary card sensing devices with first and second data storage areas of said data storage means to enable data sensed from primary and secondary cards to be entered therein; means for encoding data derived from primary and secondary cards by said primary and secondary sensing devices as the data is entered into the bit positions of said first and second data storage areas; a single bit register connected to each data storage area of said data storage means for temporarily storing bits of data read therefrom; means for serially reading bits of data from said data storage means to said bit registers at selected periods of time; data checking means connected to said bit registers to check the state of said registers every time a bit position of each storage area is read from said storage areas to said registers; and data transferring means operably connected under control of said registers to control the transfer of data from said first and second areas to third and fourth areas of said data storage means as data is read out serially from said first and second areas to said registers connected thereto.

11. In record card controlled apparatus as in claim 10 wherein said data storage means comprises magnetic cores.

12. In record card controlled apparatus as in claim 11 further comprising; mode control means selectively operable to provide a plurality of electrical signals each indicative of a particular mode, said mode control means being connected to data checking means and said data transferring means to control the operation thereof according to the different particular modes.

13. In a record card controlled machine as in claim 12 wherein said mode control means can be set for a different particular mode for each character position of each storage area in said data storage means.

14. In record card controlled apparatus as in claim 12 further comprising: data comparing means connected to said registers to receive data entered therein, said data comparing means including means for comparing data entered into the first register with that entered into the second register; means for comparing data entered into the third register with that entered into the fourth register; and means for comparing data entered into said second register with that entered into said third register, said data comparing circuitry further including means for terminating said comparing operation upon certain conditions existing at the end of data comparison for each pair of characters compared serially by bit.

15. In a record card controlled apparatus, data storage means having four data storage areas, each storage area having a predetermined number of bit positions to comprise a character, there being a predetermined number of character positions; primary and secondary card sensing devices disposed in primary and secondary card paths; means connecting said primary and secondary card sensing devices with first and second data storage areas of said data storage means to enable data sensed from primary and secondary cards to be entered therein; means for encoding data derived from primary and secondary cards as the data is entered into the bit positions of the said first and second data storage areas; a single bit register connected to each data storage area of said data storage means for temporarily storing bits of data read therefrom; means for serially reading bits of data from said data storage to said bit registers at selected periods of time; data transferring means operably connected under control of said registers for transferring data from said first and second areas to said third and fourth areas of the said data storage means as data is read out serially from said first and second areas to said registers connected thereto; data comparing circuitry connected to said registers to receive data entered therein, said data comparing circuitry including means for comparing data entered into the first register with that entered into the second register, means for comparing data entered into the third register with that entered into the fourth register, and means for comparing data entered into the said second register with that entered into said third register, said data comparing circuitry further including means for terminating said comparing operation upon certain conditions existing at the end of data comparison for each pair of characters compared serially by bit; and means for controlling said means for serially reading bits of data from said data storage to said bit registers whereby data is read to said registers during one period of time for enabling the data transferring means to transfer data from said first and second storage areas to said third and fourth storage areas and to enable said compare circuitry at another period of time to effect the data comparison between the data in said first register with said second register and that in said third register with that in said fourth register and that in said second register with that in said third register.

16. In record card controlled apparatus as in claim 15 further comprising: means for regenerating data into said data storage means after the same has been read out to said registers during the period that said data comparing circuitry is performing a comparison operation.

17. In record card controlled apparatus, a pair of card hoppers for containing primary and secondary cards; primary and secondary card sensing devices disposed in said primary and secondary card paths for sensing coded data contained in said primary and secondary cards; means for selectively feeding primary and secondary cards from said card hoppers relative to said primary and secondary sensing devices; data storage means having four data storage areas, each storage area having a predetermined number of bit positions to comprise a character, there being a predetermined number of character positions; means connecting said primary and secondary card sensing devices with first and second data storage areas of said data storage means to enable data sensed by said primary and secondary card sensing devices to be entered therein; means for translating the coded data derived from said primary and secondary cards into a collatable code directly into first and second data storage areas of said data storage means; a single bit register connected to each data storage area of said data storage means for temporarily storing bits of data read therefrom; means for serially reading bits of data from said data storage means to said bit registers at selected periods of time; data checking means connected to said bit registers to check the state of said registers every time a bit position of each storage area is read therefrom to said register; error detection means connected to said data checking means so as to be rendered operable thereby upon said data checking means detecting that said registers are in one state when they should be in an opposite state; and means connected to said error detection means to be operably controlled thereby to terminate the feeding of record cards from said primary and secondary card hoppers upon said error detection means being rendered operable by said data checking means.

18. In record card controlled apparatus as in claim 17 further comprising: data comparing circuitry connected to said registers to receive data entered therein, said data comparing circuitry including means for comparing data entered into the first register with that entered into the second register, means for comparing data entered into the third register with that entered into the fourth register, and means for comparing data entered into said second register with that entered into said third register, said data comparing circuitry further including means for terminating said comparing operation upon certain conditions existing at the end of data comparison for each pair of characters compared serially by bit; a plurality of card-stacking receptacles disposed relative to said primary and secondary card paths so as to receive cards therefrom; and means for controlling the entry of primary and secondary cards into said card-stacking receptacles, said latter means being operably controlled by said data comparing means whereby primary and secondary cards are directed into said card-stacking receptacles according to the results of the data comparisons.

References Cited by the Examiner

UNITED STATES PATENTS

| | | | |
|---|---|---|---|
| 2,966,660 | 12/60 | Beattie et al. | 340—172.5 |
| 3,008,126 | 11/61 | Estrems | 340—172.5 |
| 3,048,827 | 8/62 | Wright | 340—172.5 X |

ROBERT C. BAILEY, *Primary Examiner.*

MALCOLM A. MORRISON, *Examiner.*